US011978903B2

(12) United States Patent
Adachi et al.

(10) Patent No.: US 11,978,903 B2
(45) Date of Patent: May 7, 2024

(54) BINDER COMPOSITION FOR SECONDARY BATTERY, SLURRY COMPOSITION FOR SECONDARY BATTERY, FUNCTIONAL LAYER FOR SECONDARY BATTERY, ELECTRODE LAYER FOR SECONDARY BATTERY, AND SECONDARY BATTERY

(71) Applicant: ZEON CORPORATION, Chiyoda-ku Tokyo (JP)

(72) Inventors: Yusuke Adachi, Tokyo (JP); Kenya Sonobe, Tokyo (JP); Yasuhiro Isshiki, Tokyo (JP); Ai Masuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 286 days.

(21) Appl. No.: 16/650,382

(22) PCT Filed: Sep. 27, 2018

(86) PCT No.: PCT/JP2018/036116
§ 371 (c)(1),
(2) Date: Mar. 25, 2020

(87) PCT Pub. No.: WO2019/065909
PCT Pub. Date: Apr. 4, 2019

(65) Prior Publication Data
US 2020/0295372 A1 Sep. 17, 2020

(30) Foreign Application Priority Data
Sep. 28, 2017 (JP) .................. 2017-188835

(51) Int. Cl.
H01M 4/00 (2006.01)
C08F 220/06 (2006.01)
C08F 220/56 (2006.01)
C08L 33/00 (2006.01)
C08L 51/04 (2006.01)
H01M 4/62 (2006.01)
H01M 50/409 (2021.01)
H01M 50/443 (2021.01)

(52) U.S. Cl.
CPC .......... H01M 4/622 (2013.01); C08F 220/06 (2013.01); C08F 220/56 (2013.01); C08L 33/00 (2013.01); C08L 51/04 (2013.01); H01M 50/409 (2021.01); H01M 50/443 (2021.01); C08L 2203/20 (2013.01)

(58) Field of Classification Search
CPC ...... H01M 4/622; H01M 10/052; H01M 4/13; H01M 4/139; H01M 4/62; H01M 10/0566; H01M 50/409; H01M 50/414; H01M 50/443; H01M 2300/0025; C08F 220/06; C08F 220/56; C08F 236/10; C08L 33/00; C08L 51/04; C08L 2203/20; C08L 9/06; C08L 33/26; Y02E 60/10
See application file for complete search history.

(56) References Cited

U.S. PATENT DOCUMENTS

| 8,460,749 | B2* | 6/2013 | Hoshiba | H01M 4/622 427/217 |
| 2011/0171526 | A1* | 7/2011 | Wakizaka | H01M 10/052 252/182.1 |
| 2013/0316235 | A1* | 11/2013 | Yasuda | H01M 4/0404 429/211 |
| 2013/0330622 | A1 | 12/2013 | Sasaki | |
| 2017/0062828 | A1 | 3/2017 | Sonobe et al. | |
| 2017/0244095 | A1* | 8/2017 | Sonobe | H01M 10/0525 |
| 2018/0233728 | A1* | 8/2018 | Ohkubo | H01M 4/622 |
| 2020/0411867 | A1* | 12/2020 | Matsuo | H01M 4/131 |
| 2021/0119215 | A1* | 4/2021 | Ito | H01M 10/0525 |

FOREIGN PATENT DOCUMENTS

| CN | 105378989 A | 3/2016 |
| CN | 106463732 A | 2/2017 |
| CN | 107078298 A | 8/2017 |
| EP | 3214675 A1 | 9/2017 |
| EP | 3214675 B1 | 7/2019 |
| JP | 2012204303 A | 10/2012 |
| JP | 2013145763 A | 7/2013 |
| JP | 2015022956 A | 2/2015 |
| JP | 2015106488 A | 6/2015 |
| JP | 2015153529 A | 8/2015 |

(Continued)

OTHER PUBLICATIONS

Dec. 25, 2018, International Search Report issued in the International Patent Application No. PCT/JP2018/036116.
Mar. 31, 2020, International Preliminary Report on Patentability issued in the International Patent Application No. PCT/JP2018/036116.
May 31, 2021, the Extended European Search Report issued by the European Patent Office in the corresponding European Patent Application No. 18861088.5.
Dec. 13, 2021, Communication pursuant to Rule 114(2) EPC issued by the European Patent Office in the corresponding European Patent Application No. 18861088.5.

Primary Examiner — Nicholas P D'Aniello
(74) Attorney, Agent, or Firm — KENJA IP LAW PC

(57) ABSTRACT

Provided is a binder composition for a secondary battery with which a slurry composition for a secondary battery having low foaming can be produced, and that can improve handleability of a functional layer or electrode layer formed using the produced slurry composition for a secondary battery. The binder composition for a secondary battery contains a polymer A and a solvent. The polymer A includes an amide group-containing monomer unit and a carboxylic acid ester-containing monomer unit including an alkyl chain having a carbon number of not less than 2 and not more than 9. Content of the carboxylic acid ester-containing monomer unit in the polymer A is not less than 12 mass % and not more than 28 mass %.

8 Claims, No Drawings

(56) References Cited

FOREIGN PATENT DOCUMENTS

| | | |
|---|---|---|
| JP | 5943602 B2 | 7/2016 |
| JP | 2017168213 A | 9/2017 |
| KR | 1020170012226 A | 2/2017 |
| WO | 2012115096 A1 | 8/2012 |
| WO | 2015008626 A1 | 1/2015 |
| WO | WO-2015008626 A1 * 1/2015 ............ C08F 220/56 |
| WO | 2015186363 A1 | 12/2015 |

* cited by examiner

BINDER COMPOSITION FOR SECONDARY BATTERY, SLURRY COMPOSITION FOR SECONDARY BATTERY, FUNCTIONAL LAYER FOR SECONDARY BATTERY, ELECTRODE LAYER FOR SECONDARY BATTERY, AND SECONDARY BATTERY

TECHNICAL FIELD

The present disclosure relates to a binder composition for a secondary battery, a slurry composition for a secondary battery, a functional layer for a secondary battery, an electrode layer for a secondary battery, and a secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery components such as electrodes (positive electrode and negative electrode) that each include an electrode layer and a separator that isolates the positive electrode and the negative electrode from one another and prevents short-circuiting between the positive and negative electrodes. In recent years, it has become common to use battery components including functional layers such as a porous membrane layer for improving heat resistance and strength or an adhesive layer for improving adhesiveness between battery components.

A binder that displays binding capacity may be used with an objective of, for example, binding ingredients in a battery component such as described above or binding battery components to one another. Moreover, attempts are being made to improve binders used in formation of electrode layers such as electrode mixed material layers (positive electrode mixed material layers, negative electrode mixed material layers, etc.) or in formation of functional layers such as porous membrane layers and adhesive layers (for example, refer to Patent Literature (PTL) 1 to 3).

PTL 1 proposes a technique for forming a layer having excellent close adherence with a current collector or a separator and for producing an electrical accumulator having excellent charge/discharge characteristics by using a slurry for an electrical accumulator containing a water-soluble polymer that includes a repeating unit derived from (meth) acrylamide.

PTL 2 proposes a technique for forming a layer having excellent close adherence with a current collector or a separator and for producing an electrical accumulator having excellent charge/discharge characteristics by using a slurry for an electrical accumulator electrode containing a water-soluble polymer that includes a repeating unit derived from (meth)acrylamide, an active material of a specific size, and a liquid medium.

PTL 3 proposes a technique for providing sufficient close adherence with a metal current collector, for providing electrochemical stability and inhibiting electrochemical cell swelling, and for maintaining conventional electrostatic capacity and internal resistance while improving cycle characteristics, in particular, of a secondary battery by using an acrylic water dispersion for an electrochemical cell containing: a water-soluble resin (a) obtained through polymerization of a monomer group including (i) an unsaturated carboxylic acid polymerizable monomer, (ii) (meth)acrylamide, and (iii) a vinyl monomer; and organic particles (b) obtained through emulsion polymerization of a vinyl monomer.

CITATION LIST

Patent Literature

PTL 1: JP 2015-022956 A
PTL 2: JP 2015-106488 A
PTL 3: JP 5943602 B

SUMMARY

Technical Problem

However, with regards to secondary batteries, not enough consideration has been given to a problem of foaming of a slurry composition for a secondary battery and a problem of handleability of a functional layer or electrode layer. Accordingly, there is demand for the provision of a technique that, in relation to secondary batteries, enables production of a slurry composition for a secondary battery having low foaming and improves handleability of a functional layer or electrode layer formed using the produced slurry composition for a secondary battery.

Solution to Problem

The inventors carried out diligent investigation with the aim of providing a technique that enables production of a slurry composition for a secondary battery having low foaming and improves handleability of a functional layer or electrode layer formed using the produced slurry composition for a secondary battery. Through extensive investigation, the inventors discovered that by using a binder composition containing a specific polymer A and a solvent, it is possible to produce a slurry composition for a secondary battery having low foaming and improve handleability of a functional layer or electrode layer formed using the produced slurry composition for a secondary battery, and in this manner completed the present disclosure.

Specifically, the present disclosure aims to advantageously solve the problems set forth above by disclosing a binder composition for a secondary battery comprising a polymer A and a solvent, wherein the polymer A includes an amide group-containing monomer unit and a carboxylic acid ester-containing monomer unit including an alkyl chain having a carbon number of not less than 2 and not more than 9, and content of the carboxylic acid ester-containing monomer unit in the polymer A is not less than 12 mass % and not more than 28 mass %. By using a binder composition for a secondary battery that contains a solvent and a polymer A including an amide group-containing monomer unit and a specific amount of a carboxylic acid ester-containing monomer unit including an alkyl chain having a carbon number of not less than 2 and not more than 9 in this manner, it is possible to produce a slurry composition for a secondary battery having low foaming and improve handleability of a functional layer or electrode layer formed using the produced slurry composition for a secondary battery.

The phrase "including a monomer unit" as used in the present disclosure means that "a polymer obtained with the monomer includes a repeating unit derived from the monomer". Moreover, the phrase "improve handleability of a functional layer" as used in the specification of the present application is inclusive of, for example, improving "blocking resistance" evaluated in the EXAMPLES section of the present application, and the phrase "improve handleability of an electrode layer" is inclusive of, for example, reducing "electrode layer peeling during electrode roll pressing" evaluated in the EXAMPLES section of the present application.

Also note that "fractional content of an amide group-containing monomer unit" and "fractional content of a carboxylic acid ester-containing monomer unit" referred to in the present disclosure can be measured by a nuclear magnetic resonance (NMR) method such as $^1$H-NMR.

In the presently disclosed binder composition for a secondary battery, content of the amide group-containing monomer unit in the polymer A is preferably not less than 25 mass % and not more than 40 mass %. When the content of the amide group-containing monomer unit in the polymer A is not less than 25 mass % and not more than 40 mass %, handleability of a functional layer or electrode layer formed using a produced slurry composition for a secondary battery can be further improved, and cycle characteristics of a secondary battery including an electrode or separator formed using the binder composition can be improved.

In the presently disclosed binder composition for a secondary battery, it is preferable that the polymer A further includes an acid functional group-containing monomer unit, and that content of the acid functional group-containing monomer unit in the polymer A is not less than 32 mass % and not more than 50 mass %. When the polymer A further includes an acid functional group-containing monomer unit and the content of the acid functional group-containing monomer unit in the polymer A is not less than 32 mass % and not more than 50 mass %, thickening of a slurry composition for a secondary battery can be inhibited, and handleability of a functional layer or electrode layer formed using the produced slurry composition for a secondary battery can be further improved.

Note that "fractional content of an acid functional group-containing monomer unit" referred to in the present disclosure can be measured by a nuclear magnetic resonance (NMR) method such as $^1$H-NMR.

In the presently disclosed binder composition for a secondary battery, the weight-average molecular weight of the polymer A is preferably not less than 50,000 and not more than 10,000,000. When the weight-average molecular weight of the polymer A is not less than 50,000 and not more than 10,000,000, thickening of a slurry composition for a secondary battery can be inhibited, handleability of a functional layer or electrode layer formed using the produced slurry composition for a secondary battery can be further improved, the surface of an electrode active material can be well covered by a binding layer formed by the binder composition for a secondary battery in a situation in which the binder composition for a secondary battery contains an electrode active material, and adhesive strength of a functional layer or electrode layer formed using the binder composition can be improved.

Note that the "weight-average molecular weight of a polymer A" referred to in the present disclosure can be measured by a method described in the EXAMPLES section of the present application.

The presently disclosed binder composition for a secondary battery preferably further comprises a polymer B, wherein the polymer B includes either or both of an aliphatic conjugated diene monomer unit and an aromatic-containing monomer unit. When the polymer B includes either or both of an aliphatic conjugated diene monomer unit and an aromatic-containing monomer unit, thickening of a slurry composition for a secondary battery can be inhibited, handleability of a functional layer or electrode layer formed using the produced slurry composition for a secondary battery can be further improved, and adhesive strength of a functional layer or electrode layer formed using the binder composition can be improved.

Note that "fractional content of an aliphatic conjugated diene monomer unit" and "fractional content of an aromatic-containing monomer unit" referred to in the present disclosure can be measured by a nuclear magnetic resonance (NMR) method such as $^1$H-NMR.

The present disclosure also aims to advantageously solve the problems set forth above by disclosing a slurry composition for a secondary battery comprising any one of the binder compositions for a secondary battery set forth above and non-conductive fine particles. A slurry composition for a secondary battery that contains any one of the binder compositions for a secondary battery set forth above and non-conductive fine particles in this manner can reduce foaming, can form a functional layer having improved handleability, and can form a porous membrane layer having excellent heat resistance and strength.

The present disclosure also aims to advantageously solve the problems set forth above by disclosing a slurry composition for a secondary battery comprising any one of the binder compositions for a secondary battery set forth above and an electrode active material. A slurry composition for a secondary battery that contains any one of the binder compositions for a secondary battery set forth above and an electrode active material in this manner can reduce foaming, can form an electrode layer having improved handleability, and can form an electrode layer that has excellent peel strength and can cause a secondary battery in which an electrode is used to display excellent cycle characteristics.

The present disclosure also aims to advantageously solve the problems set forth above by disclosing a functional layer for a secondary battery formed using any one of the slurry compositions for a secondary battery set forth above. A functional layer for a secondary battery that is formed using any one of the slurry compositions for a secondary battery set forth above in this manner has excellent handleability.

The present disclosure also aims to advantageously solve the problems set forth above by disclosing an electrode layer for a secondary battery that is preferably formed using the slurry composition for a secondary battery set forth above. An electrode layer for a secondary battery that is formed using the slurry composition for a secondary battery set forth above has excellent handleability.

The present disclosure also aims to advantageously solve the problems set forth above by disclosing a secondary battery comprising a positive electrode, a negative electrode, a separator, and an electrolyte solution, wherein at least one of the positive electrode, the negative electrode, and the separator includes the functional layer for a secondary battery set forth above or the electrode layer for a secondary battery set forth above. When at least one of the positive electrode, the negative electrode, and the separator includes the functional layer for a secondary battery set forth above or the electrode layer for a secondary battery set forth above in this manner, it is possible to provide a secondary battery including a functional layer for a secondary battery or an electrode layer for a secondary battery that has excellent handleability.

Advantageous Effect

According to the present disclosure, it is possible to provide a binder composition for a secondary battery with which a slurry composition for a secondary battery having low foaming can be produced, and that enables formation of a functional layer or electrode layer having excellent handleability using the produced slurry composition for a secondary battery.

Moreover, according to the present disclosure, it is possible to provide a slurry composition for a secondary battery that can reduce foaming and with which a functional layer or electrode layer having excellent handleability can be formed.

Furthermore, according to the present disclosure, it is possible to provide a functional layer for a secondary battery having excellent handleability.

Also, according to the present disclosure, it is possible to provide an electrode layer for a secondary battery having excellent handleability.

Moreover, according to the present disclosure, it is possible to provide a secondary battery including a functional layer for a secondary battery or an electrode layer for a secondary battery having excellent handleability.

DETAILED DESCRIPTION

The following provides a detailed description of embodiments of the present disclosure.

The presently disclosed binder composition for a secondary battery can be used in formation of an electrode layer on a current collector of an electrode, or in formation of a functional layer on the aforementioned electrode layer (i.e., on an electrode substrate) or on a separator substrate. Moreover, the presently disclosed slurry composition for a secondary battery contains the presently disclosed binder composition for a secondary battery and can be used as a material in production of the presently disclosed functional layer for a secondary battery or the presently disclosed electrode layer for a secondary battery. Furthermore, the presently disclosed functional layer for a secondary battery is produced using the presently disclosed slurry composition for a secondary battery and may constitute part of a separator or an electrode, for example. Also, the presently disclosed electrode layer for a secondary battery is produced using the presently disclosed slurry composition for a secondary battery and constitutes part of an electrode. Moreover, the presently disclosed secondary battery includes the presently disclosed functional layer for a secondary battery or the presently disclosed electrode layer for a secondary battery.

(Binder Composition for Secondary Battery)

Features of the presently disclosed binder composition for a secondary battery are that the binder composition for a secondary battery contains a polymer A, a solvent, and an optional polymer B, the polymer A includes an amide group-containing monomer unit and a carboxylic acid ester-containing monomer unit including an alkyl chain having a carbon number of not less than 2 and not more than 9, and the content of the carboxylic acid ester-containing monomer unit in the polymer A is not less than 12 mass % and not more than 28 mass %.

By using the presently disclosed binder composition for a secondary battery, it is possible to produce a slurry composition for a secondary battery having low foaming and to improve handleability of a functional layer or electrode layer formed using the produced slurry composition for a secondary battery. Moreover, the presently disclosed binder composition for a secondary battery can be favorably used as either a binder composition for an electrode or a binder composition for a functional layer as a result of the polymer A in the presently disclosed binder composition for a secondary battery having excellent binding capacity. The following provides a description of the presently disclosed binder composition for a secondary battery using cases in which the binder composition for a secondary battery is used to form an electrode layer and a functional layer as examples.

<Polymer A>

The polymer A includes an amide group-containing monomer unit and a carboxylic acid ester-containing monomer unit including an alkyl chain having a carbon number of not less than 2 and not more than 9, and may optionally include monomer units other than the amide group-containing monomer unit and the carboxylic acid ester-containing monomer unit including an alkyl chain having a carbon number of not less than 2 and not more than 9. By providing the polymer A with a monomer make-up such as described above, it is possible to produce a slurry composition for a secondary battery having low foaming. Moreover, a functional layer or electrode layer that contains the polymer A having a monomer make-up such as described above has excellent handleability.

The polymer A is preferably a water-soluble polymer. When the polymer A is a water-soluble polymer, the viscosity of a slurry composition can be controlled, and a functional layer or electrode layer of uniform thickness can be obtained.

Note that when a polymer is referred to as "water-soluble" in the present disclosure, this means that when 0.5 g of the polymer is dissolved in 100 g of water at 25° C., insoluble content is less than 0.5 mass %.

[Amide Group-Containing Monomer Unit]

Examples of amide group-containing monomers that can form the amide group-containing monomer unit include methacrylamide, acrylamide, dimethylacrylamide, diethylacrylamide, diacetone acrylamide, hydroxyethylacrylamide, and hydroxymethylacrylamide. One of these amide group-containing monomers may be used individually, or two or more of these amide group-containing monomers may be used in combination in a freely selected ratio. Of these amide group-containing monomers, acrylamide is preferable from a viewpoint of slurry composition viscosity.

The content of the amide group-containing monomer unit in the polymer A (proportion constituted by the amide group-containing monomer unit among all monomer units included in the polymer A) is preferably 25 mass % or more, more preferably 27 mass % or more, and particularly preferably 30 mass % or more, and is preferably 40 mass % or less, and more preferably 37 mass % or less. When the content of the amide group-containing monomer unit in the polymer A is not less than any of the lower limits set forth above, cycle characteristics of a secondary battery including an electrode or separator formed using the binder composition can be improved. On the other hand, when the content of the amide group-containing monomer unit in the polymer A is not more than any of the upper limits set forth above, handleability of a functional layer or electrode layer formed using a produced slurry composition for a secondary battery can be further improved.

Note that the content of an amide group-containing monomer unit in the polymer A (proportion constituted by the amide group-containing monomer unit among all monomer units included in the polymer A) can be measured by a nuclear magnetic resonance (NMR) method such as $^1$H-NMR.

[Carboxylic Acid Ester-Containing Monomer Unit Including Alkyl Chain Having Carbon Number of not Less than 2 and not More than 9]

Examples of carboxylic acid ester-containing monomers including an alkyl chain having a carbon number of not less than 2 and not more than 9 that can form the carboxylic acid ester-containing monomer unit including an alkyl chain having a carbon number of not less than 2 and not more than 9 include ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, and nonyl (meth)acrylate. One of these carboxylic acid ester-containing monomers may be used individually, or two or more of these carboxylic acid ester-containing monomers may be used in combination in a freely selected ratio. Of these carboxylic acid ester-containing monomers, butyl acrylate is preferable from a viewpoint of affinity with an active material.

Note that in the present disclosure, "(meth)acrylate" is used to indicate "acrylate" and/or "methacrylate".

The carbon number of the alkyl chain in the carboxylic acid ester-containing monomer unit is required to be 2 or more, and is preferably 3 or more. Moreover, the carbon number of the alkyl chain in the carboxylic acid ester-containing monomer unit is required to be 9 or less, and is preferably 8 or less, more preferably 6 or less, and particularly preferably 5 or less. When the carbon number of the alkyl chain in the carboxylic acid ester-containing monomer unit is not less than any of the lower limits set forth above, handleability of a functional layer or electrode layer formed using a produced slurry composition for a secondary battery can be further improved. On the other hand, when the carbon number of the alkyl chain in the carboxylic acid ester-containing monomer unit is not more than any of the upper limits set forth above, a slurry composition for a secondary battery having low foaming can be produced, and handleability of a functional layer or electrode layer formed using the produced slurry composition for a secondary battery can be further improved.

The content of the carboxylic acid ester-containing monomer unit in the polymer A (proportion constituted by the carboxylic acid ester-containing monomer unit among all monomer units included in the polymer A) is required to be 12 mass % or more, and is preferably 17 mass % or more, and more preferably 18 mass % or more. Moreover, the content of the carboxylic acid ester-containing monomer unit in the polymer A is required to be 28 mass % or less, and is preferably 25 mass % or less, and more preferably 23 mass % or less. When the content of the carboxylic acid ester-containing monomer unit in the polymer A is not less than any of the lower limits set forth above, handleability of a functional layer or electrode layer formed using a produced slurry composition for a secondary battery can be further improved, and the surface of an electrode active material can be well covered by a binding layer formed from the binder composition for a secondary battery in a situation in which the binder composition for a secondary battery contains an electrode active material. On the other hand, when the content of the carboxylic acid ester-containing monomer unit in the polymer A is not more than any of the upper limits set forth above, a slurry composition for a secondary battery having low foaming can be produced, and handleability of a functional layer or electrode layer formed using the produced slurry composition for a secondary battery can be further improved.

Note that the content of a carboxylic acid ester-containing monomer unit in the polymer A (proportion constituted by the carboxylic acid ester-containing monomer unit among all monomer units included in the polymer A) can be measured by a nuclear magnetic resonance (NMR) method such as $^1$H-NMR.

Also note that the additive amount in polymerization and the amount of a monomer unit in a polymer roughly match one another.

[Other Monomer Units]

Examples of monomer units other than the amide group-containing monomer unit and the carboxylic acid ester-containing monomer unit including an alkyl chain having a carbon number of not less than 2 and not more than 9 include, but are not specifically limited to, an acid group-containing monomer unit. One other monomer unit may be used individually, or two or more other monomer units may be used in combination in a freely selected ratio.

[[Acid Group-Containing Monomer Unit]]

Acid group-containing monomers (other monomers) that can form the acid group-containing monomer unit are not specifically limited other than being monomers that include an acid group and examples thereof include carboxyl group-containing monomers (carboxylic acid group-containing monomers), sulfo group-containing monomers, and phosphate group-containing monomers.

Examples of carboxyl group-containing monomers include monocarboxylic acids, dicarboxylic acids, and salts thereof (sodium salts, lithium salts, etc.). Examples of monocarboxylic acids include acrylic acid, methacrylic acid, and crotonic acid. Examples of dicarboxylic acids include maleic acid, fumaric acid, and itaconic acid.

Examples of sulfo group-containing monomers include styrene sulfonic acid, vinyl sulfonic acid, methyl vinyl sulfonic acid, (meth)allyl sulfonic acid, (meth)acrylic acid 2-sulfoethyl, 2-acrylamido-2-methylpropane sulfonic acid, 3-allyloxy-2-hydroxypropane sulfonic acid, and salts thereof (lithium salts, sodium salts, etc.).

Note that in the present disclosure, "(meth)allyl" is used to indicate "allyl" and/or "methallyl", and "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, ethyl-(meth)acryloyloxyethyl phosphate, and salts thereof (sodium salts, lithium salts, etc.). Note that in the present disclosure, "(meth) acryloyl" is used to indicate "acryloyl" and/or "methacryloyl".

Of these acid group-containing monomers, carboxyl group-containing monomers are preferable, methacrylic acid, itaconic acid, acrylic acid, and maleic acid are more preferable, and acrylic acid is even more preferable from a viewpoint of copolymerizability in the polymer A.

The content of the acid functional group-containing monomer unit in the polymer A (proportion constituted by the acid group-containing monomer unit among all monomer units included in the polymer A) is preferably 32 mass % or more, more preferably 35 mass % or more, and particularly preferably 40 mass % or more, and is preferably 50 mass % or less, and more preferably 48 mass % or less. When the content of the acid group-containing monomer unit in the polymer A is not less than any of the lower limits set forth above, handleability of a functional layer or electrode layer formed using a produced slurry composition for a secondary battery can be further improved, and the surface of an electrode active material can be well covered by a binding layer formed from the binder composition for a secondary battery in a situation in which the binder composition for a secondary battery contains an electrode active material. On the other hand, when the content of the acid group-containing monomer unit in the polymer A is not more than any of the upper limits set forth above, a slurry composition for a secondary battery for which thickening is inhibited can be produced.

Note that the content of an acid functional group-containing monomer unit in the polymer A (proportion constituted by the acid group-containing monomer unit among all monomer units included in the polymer A) can be measured by a nuclear magnetic resonance (NMR) method such as $^1$H-NMR.

[Production Method of Polymer A]

The polymer A can be produced through polymerization of a monomer composition containing the monomers described above, carried out in an aqueous solvent such as water, for example. The fractional content of each monomer in the monomer composition can be set in accordance with the content (fractional content) of each repeating unit (monomer unit) in the polymer A.

The method of polymerization is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Typically used additives such as emulsifiers, dispersants, polymerization initiators, and polymerization aids may be used in the polymerization. The amounts of these additives may also be the same as typically used. The polymerization conditions can be adjusted as appropriate depending on the polymerization method, the type of polymerization initiator, and so forth.

[Properties of Polymer A]

The weight-average molecular weight of the polymer A is preferably 50,000 or more, more preferably 100,000 or more, even more preferably 300,000 or more, particularly preferably 1,000,000 or more, and most preferably 3,000,000 or more, and is preferably 10,000,000 or less, more preferably 8,000,000 or less, even more preferably 7,000,000 or less, particularly preferably 6,000,000 or less, and most preferably 5,000,000 or less. When the weight-average molecular weight of the polymer A is not less than any of the lower limits set forth above, adhesive strength of a functional layer or electrode layer formed using the binder composition can be improved. On the other hand, when the weight-average molecular weight of the polymer A is not more than any of the upper limits set forth above, a slurry composition for a secondary battery for which thickening is inhibited can be produced, handleability of a functional layer or electrode layer formed using the produced slurry composition for a secondary battery can be further improved, and the surface of an electrode active material can be well covered by a binding layer formed from the binder composition for a secondary battery in a situation in which the binder composition for a secondary battery contains an electrode active material.

Note that the "weight-average molecular weight" of the polymer A is measured by a method described in the EXAMPLES section of the present specification.

{{Glass-Transition Temperature Tg}}

The glass-transition temperature Tg of the polymer A is preferably 30° C. or higher, more preferably 40° C. or higher, and particularly preferably 50° C. or higher, and is preferably 200° C. or lower, more preferably 180° C. or lower, and even more preferably 150° C. or lower.

The polymer A is preferably a polymerized product having a viscosity of 100 mPa·s or more in an aqueous solution having a solid content concentration of 10 mass % or more. The aqueous solution is a solution obtained by diluting a polymerized product of the polymer A to 10%, or, in a case in which a dried product of the polymer A is dissolved in water, is an aqueous solution obtained by first loading 45 g of deionized water per 5 g of polymer component into a 100 mL beaker, subsequently performing heating to 60° C. while a stirrer chip is caused to rotate at 400 rpm for 2 hours, and then using a Homo Disper Model 2.5 (produced by PRIMIX Corporation) to perform stirring at 2,000 rpm or less at room temperature for 2 hours.

In terms of the viscometer measurement conditions, a sample set to a liquid temperature of 25° C. is measured at a rotation speed of 60 rpm by a Brookfield viscometer (B-type viscometer) that has been leveled, and a value after 1 minute is taken. If the upper limit of the measurement viscosity region is exceeded at a rotation speed of 60 rpm, the rotation speed is changed to whichever of 6 rpm, 3 rpm, and 0.6 rpm at which measurement is possible. The spindle of the viscometer is selected in accordance with the viscosity region by referring to the manual of the viscometer.

<Polymer B>

The polymer B includes either or both of an aliphatic conjugated diene monomer unit and an aromatic-containing monomer unit, preferably includes both an aliphatic conjugated diene monomer unit and an aromatic-containing monomer unit, and may optionally include monomer units other than the aliphatic conjugated diene monomer unit and the aromatic-containing monomer unit. The polymer B can inhibit thickening of a slurry composition for a secondary battery as a result of having a monomer make-up such as described above. Moreover, a functional layer or electrode layer that contains the polymer B having a monomer make-up such as described above has excellent handleability. Furthermore, adhesive strength of a functional layer or electrode layer formed using the binder composition can be improved. The polymer B is preferably a polymer that is not soluble and that is in the form of particles.

[Aliphatic Conjugated Diene Monomer Unit]

Examples of aliphatic conjugated diene monomers that can form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable, and 1,3-butadiene is more preferable from a viewpoint of crosslink density and distance between crosslinking sites. One aliphatic conjugated diene monomer may be used individually, or two or more aliphatic conjugated diene monomers may be used in combination in a freely selected ratio.

The content of the aliphatic conjugated diene monomer unit in the polymer B (proportion constituted by the aliphatic conjugated diene monomer unit among all monomer units included in the polymer B) is preferably 20 mass % or more, more preferably 25 mass % or more, and particularly preferably 30 mass % or more, and is preferably 70 mass % or less, more preferably 50 mass % or less, and particularly preferably 40 mass % or less. When the content of the aliphatic conjugated diene monomer unit in the polymer B is not less than any of the lower limits set forth above, handleability of a functional layer or electrode layer formed using a produced slurry composition for a secondary battery can be further improved. On the other hand, when the content of the aliphatic conjugated diene monomer unit in the polymer B is not more than any of the upper limits set forth above, a slurry composition for a secondary battery for which thickening is inhibited can be produced.

Note that the content of an aliphatic conjugated diene monomer unit in the polymer B (proportion constituted by the aliphatic conjugated diene monomer unit among all monomer units included in the polymer B) can be measured by a nuclear magnetic resonance (NMR) method such as $^1$H-NMR.

[Aromatic-Containing Monomer Unit]

Examples of aromatic-containing monomers that can form the aromatic-containing monomer unit include, but are not specifically limited to, aromatic vinyl monomers such as styrene, styrene sulfonic acid and salts thereof, α-methylstyrene, butoxystyrene, and vinylnaphthalene. Of these aromatic-containing monomers, styrene is preferable from a viewpoint of adhesive strength of a functional layer or electrode layer. One aromatic-containing monomer may be used individually, or two or more aromatic-containing monomers may be used in combination in a freely selected ratio.

The content of the aromatic-containing monomer unit in the polymer B (proportion constituted by the aromatic-containing monomer unit among all monomer units included in the polymer B) is preferably 30 mass % or more, more preferably 35 mass % or more, and particularly preferably 59 mass % or more, and is more preferably 80 mass % or less, more preferably 72 mass % or less, and more preferably 65 mass % or less. When the content of the aromatic-containing monomer unit in the polymer B is not less than any of the lower limits set forth above, adhesive strength of a functional layer or electrode layer formed using the binder composition can be improved. On the other hand, when the content of the aromatic-containing monomer unit in the polymer B is not more than any of the upper limits set forth above, handleability of a functional layer or electrode layer formed using a produced slurry composition for a secondary battery can be further improved.

Note that the content of an aromatic-containing monomer unit in the polymer B (proportion constituted by the aromatic-containing monomer unit among all monomer units included in the polymer B) can be measured by a nuclear magnetic resonance (NMR) method such as $^1$H-NMR.

[Other Monomer Units]

Examples of monomer units other than the aliphatic conjugated diene monomer unit and the aromatic-containing monomer unit include, but are not specifically limited to, an acid group-containing monomer unit and a (meth)acrylic acid ester monomer unit. One other monomer unit may be used individually, or two or more other monomer units may be used in combination in a freely selected ratio.

[[Acid Group-Containing Monomer Unit]]

Acid group-containing monomers (other monomers) that can form the acid group-containing monomer unit are not specifically limited other than being monomers that include an acid group and examples thereof include carboxyl group-containing monomers, sulfonic acid group-containing monomers, and phosphate group-containing monomers.

Examples of carboxyl group-containing monomers include monocarboxylic acids, dicarboxylic acids, and salts thereof (sodium salts, lithium salts, etc.). Examples of monocarboxylic acids include acrylic acid, methacrylic acid, and crotonic acid. Examples of dicarboxylic acids include maleic acid, fumaric acid, and itaconic acid. Of these examples, methacrylic acid, itaconic acid, acrylic acid, and maleic acid are more preferable, and itaconic acid is even more preferable from a viewpoint of slurry composition stability.

The content of other monomer units in the polymer B (proportion constituted by other monomers units among all monomer units included in the polymer B) is preferably 0.5 mass % or more, and more preferably 2 mass % or more, and is preferably 6 mass % or less, and more preferably 4 mass % or less. When the content of other monomer units in the polymer B is not less than any of the lower limits set forth above, a slurry composition can be provided with good viscosity. On the other hand, when the content of other monomer units in the polymer B is not more than any of the upper limits set forth above, a functional layer or electrode layer can be provided with good close adherence strength.

Note that the content of other monomer units in the polymer B (proportion constituted by other monomer units among all monomer units included in the polymer B) can be measured by a nuclear magnetic resonance (NMR) method such as $^1$H-NMR.

{{Glass-Transition Temperature Tg}}

The glass-transition temperature Tg of the polymer B is preferably −30° C. or higher, and more preferably −10° C. or higher, and is preferably 50° C. or lower, and more preferably 40° C. or lower.

The polymer B is preferably a polymerized product having a viscosity of less than 100 mPa·s in a water dispersion having a solid content concentration of 10 mass % or more. The measurement conditions are the same as for the polymer A.

<Ratio of Mass of Polymer A Relative to Total Mass of Polymer A and Polymer B (Mass of Polymer A/Total Mass of Polymers A and B)>

The ratio of the mass of the polymer A relative to the total mass of the polymer A and the polymer B (mass of polymer A/total mass of polymers A and B) is preferably 20 mass % or more, and more preferably 30 mass % or more, and is preferably 90 mass % or less, more preferably 80 mass % or less, particularly preferably 60 mass % or less, and most preferably 50 mass % or less. When this ratio is not less than any of the lower limits set forth above, a slurry composition can be provided with good viscosity. On the other hand, when this ratio is not more than any of the upper limits set forth above, a functional layer or electrode layer can be provided with good close adherence strength.

<Solvent>

The solvent contained in the presently disclosed binder composition for a secondary battery is not specifically limited and may, for example, be water. However, note that the solvent may be an aqueous solution or may be a mixed solution of water and a small amount of an organic solvent.

<Other Components>

The presently disclosed binder composition for a secondary battery electrode may contain other components such as a reinforcing material, a leveling agent, a viscosity modifier, and an additive for electrolyte solution, in addition to the components described above. These other components are not specifically limited so long as they do not affect the battery reactions and may be selected from commonly known components such as those described in WO 2012/115096 A1. One of these components may be used individually, or two or more of these components may be used in combination in a freely selected ratio.

<Production Method of Binder Composition for Secondary Battery>

No specific limitations are placed on the method by which the presently disclosed binder composition for a secondary battery is produced. In a case in which production of a polymer A that is a water-soluble polymer is carried out in an aqueous medium and the polymer A is obtained as an aqueous solution, for example, the aqueous solution of the polymer A may be used, as obtained, as the binder composition for a secondary battery, or other optional components may be added to the aqueous solution of the polymer A to obtain the binder composition for a secondary battery. Examples of such other components include the other components described in the subsequent "Slurry composition for secondary battery" section. Moreover, the binder composition for a secondary battery may contain a solvent other than water.

(Slurry Composition for Secondary Battery)

The presently disclosed slurry composition for a secondary battery is a slurry composition for a secondary battery that has water as a dispersion medium, that contains at least a binder composition for a secondary battery containing the above-described polymer A, solvent, and optional polymer B, and that further contains non-conductive particles or an electrode active material, and other optional components.

In a case in which the presently disclosed slurry composition for a secondary battery contains non-conductive particles, a functional layer obtained using the presently disclosed slurry composition for a secondary battery can function well as a porous membrane layer having excellent heat resistance and strength.

Moreover, in a case in which the presently disclosed slurry composition for a secondary battery contains an electrode active material, an electrode layer obtained using the presently disclosed slurry composition for a secondary battery has excellent peel strength and can function well as an electrode layer that can cause a secondary battery in which an electrode is used to display excellent cycle characteristics.

<Ratio of Mass of Polymer a Relative to Mass of all Solid Content in Slurry Composition Containing Electrode Active Material (Mass of Polymer A/Mass of all Solid Content in Slurry Composition)>

The ratio of the mass of the polymer A relative to the mass of all solid content in a slurry composition that contains an electrode active material (mass of polymer A/mass of all solid content in slurry composition) is preferably 0.2 mass % or more, and more preferably 0.5 mass % or more, and is preferably 2.0 mass % or less, and more preferably 1.5 mass % or less. When this ratio is not less than any of the lower limits set forth above, deterioration of electrode active material dispersibility can be prevented in a case in which the slurry composition contains an electrode active material. On the other hand, when this ratio is not more than any of the upper limits set forth above, cell capacity reduction and cell resistance increase can be prevented in an obtained secondary battery.

<Ratio of Mass of Polymer B Relative to Mass of all Solid Content in Slurry Composition Containing Electrode Active Material (Mass of Polymer B/Mass of all Solid Content in Slurry Composition)>

The ratio of the mass of the polymer B relative to the mass of all solid content in a slurry composition that contains an electrode active material (mass of polymer B/mass of all solid content in slurry composition) is preferably 0.2 mass % or more, and more preferably 0.5 mass % or more, and is preferably 3.0 mass % or less, and more preferably 2.5 mass % or less. When this ratio is not less than any of the lower limits set forth above, adhesive strength of an obtained electrode layer can be improved. On the other hand, when this ratio is not more than any of the upper limits set forth above, cell capacity reduction and cell resistance increase can be prevented in an obtained secondary battery.

<Ratio of Mass of Polymer a Relative to Mass of all Solid Content in Slurry Composition Containing Non-Conductive Particles (Mass of Polymer A/Mass of all Solid Content in Slurry Composition)>

The ratio of the mass of the polymer A relative to the mass of all solid content in a slurry composition that contains non-conductive particles (mass of polymer A/mass of all solid content in slurry composition) is preferably 0.2 mass % or more, more preferably 0.5 mass % or more, and particularly preferably 1.0 mass % or more, and is preferably 7.0 mass % or less, more preferably 4.0 mass % or less, and particularly preferably 3.0 mass % or less. When this ratio is not less than any of the lower limits set forth above, a porous membrane layer having excellent strength can be formed. On the other hand, when this ratio is not more than any of the upper limits set forth above, a porous membrane layer having excellent heat resistance can be formed.

<Ratio of Mass of Polymer B Relative to Mass of all Solid Content in Slurry Composition Containing Non-Conductive Particles (Mass of Polymer B/Mass of all Solid Content in Slurry Composition)>

The ratio of the mass of the polymer B relative to the mass of all solid content in a slurry composition that contains non-conductive particles (mass of polymer B/mass of all solid content in slurry composition) is preferably 0.2 mass % or more, more preferably 0.5 mass % or more, and particularly preferably 2.0 mass % or more, and is preferably 7.0 mass % or less, more preferably 5.0 mass % or less, and particularly preferably 4.0 mass % or less. When this ratio is not less than any of the lower limits set forth above, a porous membrane layer having excellent strength can be formed. On the other hand, when this ratio is not more than any of the upper limits set forth above, a porous membrane layer having excellent heat resistance can be formed.

<Non-Conductive Particles>

The non-conductive particles are particles that maintain their shape without dissolving in water or a non-aqueous electrolyte solution of a secondary battery. Moreover, the non-conductive particles are electrochemically stable and are, therefore, present stably in a functional layer in the environment of use of a secondary battery.

Various types of inorganic fine particles and organic fine particles can be used as the non-conductive particles.

Specifically, although both inorganic fine particles and organic fine particles can be used as the non-conductive particles, inorganic fine particles are normally used. The material of the non-conductive particles is preferably an electrochemically stable material that is present stably in the environment of use of a secondary battery. Examples of materials of the non-conductive particles that are preferable from a viewpoint such as set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination. The non-conductive particles are preferably aluminum oxide (alumina). The particle diameter of the non-conductive particles is not specifically limited and can be the same as that of conventionally used non-conductive particles.

<Ratio of Mass of Non-Conductive Particles Relative to Mass of all Solid Content in Slurry Composition (Mass of Non-Conductive Particles/Mass of all Solid Content in Slurry Composition)>

The ratio of the mass of the non-conductive particles relative to the mass of all solid content in the slurry composition (mass of non-conductive particles/mass of all solid content in slurry composition) is preferably 85 mass % or more, more preferably 87 mass % or more, and particularly preferably 91 mass % or more, and is preferably 99 mass % or less, and more preferably 97 mass % or less. When this ratio is not less than any of the lower limits set forth above, good heat resistance can be achieved. On the other hand, when this ratio is not more than any of the upper limits set forth above, a functional layer can be provided with good close adherence strength.

<Electrode Active Material>

The electrode active material is a material that gives and receives electrons in an electrode (positive electrode or negative electrode) of a lithium ion secondary battery. The electrode active material (positive electrode active material or negative electrode active material) of a lithium ion secondary battery is normally a material that can occlude and release lithium.

[Positive Electrode Active Material]

Specific examples of positive electrode active materials include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Examples of transition metal oxides include MnO, $MnO_2$, $V_2O_5$, $V_6O_{13}$, $TiO_2$, $Cu_2V_2O_3$, amorphous $V_2O-P_2O_5$, amorphous $MoO_3$, amorphous $V_2O_5$, and amorphous $V_6O_{13}$.

Examples of transition metal sulfides include $TiS_2$, $TiS_3$, amorphous $MoS_2$, and FeS.

Examples of complex metal oxides of lithium and transition metals include lithium-containing complex metal oxides having a layered structure, lithium-containing complex metal oxides having a spinel structure, and lithium-containing complex metal oxides having an olivine structure.

Examples of lithium-containing complex metal oxides having a layered structure include lithium-containing cobalt oxide ($LiCoO_2$), lithium-containing nickel oxide ($LiNiO_2$), a lithium-containing complex oxide of Co—Ni—Mn (Li(CoMnNi)$O_2$), a lithium-containing complex oxide of Ni—Mn—Al, a lithium-containing complex oxide of Ni—Co—Al, and a solid solution of $LiMaO_2$ and $Li_2MbO_3$. Note that the lithium-containing complex oxide of Co—Ni—Mn may, for example, be $Li[Ni_{0.5}Co_{0.2}Mn_{0.3}]O_2$ or $Li[Ni_{1/3}Co_{1/3}Mn_{1/3}]O_2$. Moreover, the solid solution of $LiMaO_2$ and $Li_2MbO_3$ may, for example, be $xLiMaO_2 \cdot (1-x)Li_2MbO_3$, where x represents a number satisfying 0<x<1, Ma represents one or more transition metals having an average oxidation state of 3+, and Mb represents one or more transition metals having an average oxidation state of 4+. Examples of solid solutions such as described above include $Li[Ni_{0.17}Li_{0.2}Co_{0.07}Mn_{0.56}]O_2$.

The term "average oxidation state" as used in the present specification refers to an average oxidation state of the "one or more transition metals" and is calculated from the molar quantities and the valences of the transition metals. For example, in a case in which the "one or more transition metals" are made up of 50 mol % of $Ni^{2-}$ and 50 mol % of $Mn^{4+}$, the average oxidation state of the "one or more transition metals" is (0.5)×(2+)+(0.5)×(4+)=3+.

Examples of lithium-containing complex metal oxides having a spinel structure include lithium manganate ($LiMn_2O_4$) and compounds in which some of the Mn in lithium manganate ($LiMn_2O_4$) is replaced by another transition metal. A specific example thereof is $Li_s[Mn_{2-t}Mc_t]O_4$ such as $LiNi_{0.5}Mn_{1.5}O_4$, where Mc represents one or more transition metals having an average oxidation state of 4+, specific examples of which include Ni, Co, Fe, Cu, and Cr; t represents a number satisfying 0<t<1; and s represents a number satisfying 0≤s≤1. Note that a lithium-rich spinel compound represented by $Li_{1+x}Mn_{2-x}O_4$ (0<x<2) can also be used as a positive electrode active material.

Examples of lithium-containing complex metal oxides having an olivine structure include olivine-type lithium phosphate compounds represented by $Li_yMdPO_4$ such as olivine-type lithium iron phosphate ($LiFePO_4$) and olivine-type lithium manganese phosphate ($LiMnPO_4$), where Md represents one or more transition metals having an average oxidation state of 3+, examples of which include Mn, Fe, and Co, and y represents a number satisfying 0≤y≤2. Md of the olivine-type lithium phosphate compounds represented by $Li_yMdPO_4$ may be partly replaced by another metal. Examples of possible replacing metals include Cu, Mg, Zn, V, Ca, Sr, Ba, Ti, Al, Si, B, and Mo.

[Negative Electrode Active Material]

Examples of negative electrode active materials include carbon-based negative electrode active materials, metal-based negative electrode active materials, and negative electrode active materials that are a combination thereof.

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of carbonaceous materials include graphitizing carbon for which the carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

The graphitic material is a material that has high crystallinity of a similar level to graphite and that can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of artificial graphite include artificial graphite obtained by heat-treating carbon containing graphitizing carbon mostly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal; simple substances of metals that can form lithium alloys (for example, Ag, Al, Ba, Bi, Cu, Ga, Ge, In, Ni, P, Pb, Sb, Si, Sn, Sr, Zn, and Ti) and alloys thereof; and oxides, sulfides, nitrides, silicides, carbides, and phosphides of any of the preceding examples. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

Examples of the silicon-based negative electrode active material include silicon (Si), a silicon-containing alloy, SiO, $SiO_x$, and a composite of conductive carbon and a Si-containing material obtained by coating or combining a Si-containing material with conductive carbon. One of these silicon-based negative electrode active materials may be used individually, or two or more of these silicon-based negative electrode active materials may be used in combination.

The silicon-containing alloy may be, for example, an alloy composition that contains silicon, aluminum, and transition metals such as iron, and further contains rare-earth elements such as tin and yttrium.

$SiO_x$ is a compound containing Si and at least one of SiO and $SiO_2$, where x is normally not less than 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has optionally been pulverized and mixed with the polymer, the heat treatment can be performed at a temperature of 900° C. or higher, and preferably 1000° C. or higher, in an atmosphere containing organic gas and/or vapor.

The composite of a Si-containing material and conductive carbon may be a compound obtained, for example, by heat-treating a pulverized mixture of SiO, a polymer such as polyvinyl alcohol, and optionally a carbon material in an atmosphere containing organic gas and/or vapor. Furthermore, the composite can also be obtained by commonly known methods such as a method of coating the surfaces of particles of SiO with organic gas or the like by chemical vapor deposition, or a method of forming composite particles (granulation) by a mechanochemical process using SiO particles and graphite or artificial graphite.

<Ratio of Mass of Electrode Active Material Relative to Mass of all Solid Content in Slurry Composition (Mass of Electrode Active Material/Mass of all Solid Content in Slurry Composition)>

The ratio of the mass of the electrode active material relative to the mass of all solid content in the slurry composition (mass of electrode active material/mass of all solid content in slurry composition) is preferably 90 mass % or more, more preferably 92 mass % or more, and particularly preferably 97 mass % or more, and is preferably 99 mass % or less, and more preferably 98 mass % or less. When this ratio is not less than any of the lower limits set forth above, cell capacity reduction can be prevented in an obtained secondary battery. On the other hand, when this ratio is not more than any of the upper limits set forth above, cycle characteristics of an obtained secondary battery can be improved.

<Other Components>

The slurry composition for a secondary battery may contain other optional components besides the components described above. No specific limitations are placed on these optional components so long as they do not have an excessively negative influence on battery reactions in a secondary battery in which a functional layer or electrode layer is used. Furthermore, one of such optional components may be used, or two or more of such optional components may be used.

Examples of optional components that can be used include particulate binders, wetting agents, leveling agents, and electrolyte solution decomposition inhibitors.

<Production of Slurry Composition for Secondary Battery>

The slurry composition for a secondary battery set forth above can be produced by dispersing the above-described components in an aqueous medium serving as a dispersion medium. Specifically, the slurry composition for a secondary battery can be produced by mixing the above-described components and the aqueous medium using a mixer such as a ball mill, a sand mill, a bead mill, a pigment disperser, a grinding machine, an ultrasonic disperser, a homogenizer, a planetary mixer, or a FILMIX. A high-level disperser such as a bead mill, a roll mill, or a FILMIX may also be used from a viewpoint of applying a high level of dispersing shear. Mixing of the above-described components and the aqueous medium may normally be performed within a range of room temperature to 80° C. for a period of 10 minutes to several hours.

Although water is normally used as the aqueous medium, alternatively, an aqueous solution of a freely selected compound or a mixed solution of a small amount of an organic medium and water may be used. Note that water used as the aqueous medium may include water that was contained in the binder composition.

(Functional Layer for Secondary Battery)

The presently disclosed functional layer for a secondary battery is a layer that is formed from the non-conductive particle-containing slurry composition for a secondary battery set forth above. For example, the presently disclosed functional layer for a secondary battery can be formed by applying the slurry composition for a secondary battery set forth above onto the surface of a suitable substrate to form a coating film, and then drying the coating film that is formed. In other words, the presently disclosed functional layer for a secondary battery is formed by a dried product of the slurry composition for a secondary battery set forth above and normally contains the previously described polymer A, non-conductive particles, and other optional components.

Note that the ratio of components (excluding a dispersion medium such as water) contained in the presently disclosed functional layer for a secondary battery is normally the same as the ratio in which these components are contained in the slurry composition for a secondary battery set forth above. Moreover, the preferred ratio of these components in the functional layer for a secondary battery is the same as the preferred ratio of the components in the slurry composition for a secondary battery set forth above.

The presently disclosed functional layer for a secondary battery can function well as a porous membrane layer having excellent heat resistance and strength as a result of being formed using the presently disclosed slurry composition for a secondary battery. Moreover, the presently disclosed functional layer for a secondary battery can enhance battery characteristics such as cycle characteristics of a secondary battery.

<Substrate>

No specific limitations are placed on the substrate on which the functional layer for a secondary battery is formed. For example, the substrate may be a separator substrate in a case in which the functional layer for a secondary battery is used as a member that constitutes part of a separator and may be an electrode substrate obtained by forming an electrode layer on a current collector in a case in which the functional layer is used as a member that constitutes part of an electrode. No specific limitations are placed on the method of use of the functional layer formed on the substrate. For example, the functional layer may be formed on a separator substrate or the like and then used in this form as a battery component such as a separator. Alternatively, the functional layer may be formed on an electrode substrate and then used as an electrode. Further alternatively, the functional layer may be formed on a releasable substrate, peeled from the substrate, and then pasted onto another substrate to be used as a battery component.

However, it is preferable that a separator substrate or an electrode substrate is used as the substrate from a viewpoint of raising battery component production efficiency since a step of peeling a releasable substrate from the functional layer can be omitted.

[Separator Substrate]

The separator substrate is not specifically limited and may be a known separator substrate such as an organic separator substrate. The organic separator substrate is a porous member that is made from an organic material. The organic separator substrate may, for example, be a microporous membrane containing a polyolefin resin such as polyethylene or polypropylene, or an aromatic polyamide resin, and is preferably a microporous membrane made from polyethylene due to the excellent strength thereof. Note that although the organic separator substrate may be of any thickness, the thickness thereof is normally 0.5 µm or more, and preferably 5 µm or more, and is normally 40 µm or less, preferably 30 µm or less, and more preferably 20 µm or less.

[Electrode Substrate]

The electrode substrate (positive electrode substrate or negative electrode substrate) is not specifically limited and may, for example, be an electrode substrate obtained by forming an electrode layer on a current collector.

Note that the current collector, the electrode active material (positive electrode active material or negative electrode active material) and binder for an electrode layer (binder for positive electrode mixed material layer or binder for negative electrode mixed material layer) in the electrode layer, and the method by which the electrode layer is formed on the current collector may be known examples thereof such as any of those described in JP 2013-145763 A, for example. Moreover, the polymer A contained in the presently disclosed binder composition for a secondary battery may be used as the binder for an electrode layer.

[Releasable Substrate]

Any known releasable substrate may be used without any specific limitations as a releasable substrate on which the functional layer is formed.

<Formation Method of Functional Layer for Secondary Battery>

Examples of methods by which the functional layer may be formed on a substrate such as the separator substrate or electrode substrate described above include:

(1) a method in which the slurry composition for a secondary battery is applied onto the surface of a separator substrate or an electrode substrate and is then dried;

(2) a method in which a separator substrate or an electrode substrate is immersed in the slurry composition for a secondary battery and is then dried; and (3) a method in which the slurry composition for a secondary battery is applied onto a releasable substrate, is dried to produce a functional layer, and then the obtained functional layer for a secondary battery is transferred onto the surface of a separator substrate or an electrode substrate.

Of these methods, method (1) is particularly preferable since it allows simple control of the thickness of the functional layer for a secondary battery. In more detail, method (1) includes a step of applying the slurry composition for a secondary battery onto a separator substrate or an electrode substrate (application step) and a step of drying the slurry composition for a secondary battery that has been applied onto the separator substrate or the electrode substrate to form a functional layer (functional layer formation step).

[Application Step]

No specific limitations are placed on the method by which the slurry composition for a secondary battery is applied onto the substrate in the application step. For example, a method such as doctor blading, reverse roll coating, direct roll coating, gravure coating, extrusion coating, or brush coating may be used.

[Functional Layer Formation Step]

The slurry composition for a secondary battery on the substrate may be dried by any commonly known method without any specific limitations in the functional layer formation step. For example, the drying method may be drying by warm, hot, or low-humidity air; drying in a vacuum; or drying by irradiation with infrared light, electron beams, or the like. Although no specific limitations are placed on the drying conditions, the drying temperature is preferably 50° C. to 100° C., and the drying time is preferably 5 minutes to 30 minutes.

The thickness of the functional layer for a secondary battery formed on the substrate can be adjusted as appropriate.

(Electrode Layer for Secondary Battery)

The presently disclosed electrode layer for a secondary battery is a layer that is formed from the electrode active material-containing slurry composition for a secondary battery set forth above. For example, the presently disclosed electrode layer for a secondary battery can be formed by applying the slurry composition for a secondary battery set forth above onto the surface of a suitable current collector to form a coating film, and then drying the coating film that is formed. In other words, the presently disclosed electrode layer for a secondary battery is formed by a dried product of the slurry composition for a secondary battery set forth above and normally contains the previously described polymer A, electrode active material, and other optional components.

Note that the ratio of components (excluding a dispersion medium such as water) contained in the presently disclosed electrode layer for a secondary battery is normally the same as the ratio in which these components are contained in the slurry composition for a secondary battery set forth above. Moreover, the preferred ratio of these components in the electrode layer for a secondary battery is the same as the preferred ratio of the components in the slurry composition for a secondary battery set forth above.

The presently disclosed electrode layer for a secondary battery has high peel strength and can cause a secondary battery to display excellent cycle characteristics as a result of being formed from the presently disclosed slurry composition for a secondary battery.

<Formation Method of Electrode Layer for Secondary Battery>

The presently disclosed electrode layer for a secondary battery is formed, for example, through a step of applying the slurry composition for a secondary battery set forth above onto a current collector (application step) and a step of drying the slurry composition for a secondary battery that has been applied onto the current collector to form an electrode layer on the current collector (drying step).

[Application Step]

The slurry composition for a secondary battery can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode layer to be obtained after drying.

The current collector onto which the slurry composition for a secondary battery is applied is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector for a negative electrode. On the other hand, aluminum foil is particularly preferable as a current collector for a positive electrode. One of these materials may be used individually, or two or more of these materials may be used in combination in a freely selected ratio.

[Drying Step]

The slurry composition for a secondary battery on the current collector may be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition for a secondary battery on the current collector in this manner forms an electrode layer on the current collector and thereby provides an electrode for a secondary battery that includes the current collector and the electrode layer.

Note that after the drying step, the electrode layer may be subjected to pressure application treatment (pressing process) by mold pressing, roll pressing, or the like. The pressing process can improve close adherence between the electrode layer and the current collector. Moreover, the electrode layer can be densified and a more compact secondary battery size can be achieved.

(Secondary Battery)

The presently disclosed secondary battery includes the presently disclosed functional layer for a secondary battery or the presently disclosed electrode layer for a secondary battery set forth above. More specifically, the presently disclosed secondary battery includes a positive electrode, a negative electrode, a separator, and an electrolyte solution, wherein at least one battery component among the positive electrode, the negative electrode, and the separator includes the functional layer for a secondary battery or the electrode layer for a secondary battery set forth above.

As a result of the presently disclosed secondary battery including the presently disclosed functional layer for a secondary battery or the presently disclosed electrode layer for a secondary battery, it is possible to provide a secondary battery including a functional layer for a secondary battery or an electrode layer for a secondary battery having excellent handleability.

<Positive Electrode, Negative Electrode, and Separator>

At least one of the positive electrode, the negative electrode, and the separator used in the presently disclosed secondary battery includes a functional layer for a secondary battery or an electrode layer for a secondary battery. Specifically, a positive electrode or negative electrode that includes a functional layer for a secondary battery may be an electrode produced by forming an electrode layer as an electrode layer for a secondary battery on a current collector to obtain an electrode substrate, and further providing a functional layer on the electrode substrate. Moreover, a separator including a functional layer for a secondary battery may be a separator obtained by providing a functional layer for a secondary battery on a separator substrate. The electrode substrate and the separator substrate can be any of the examples previously described in the "Substrate" section. A positive electrode or negative electrode including an electrode layer for a secondary battery may be an electrode obtained by forming an electrode layer as an electrode layer for a secondary battery on a current collector.

<Positive Electrode and Negative Electrode>

So long as at least one of the positive electrode, the negative electrode, and the separator used in the secondary battery includes the presently disclosed functional layer for a secondary battery or the presently disclosed electrode layer for a secondary battery as described above, the negative electrode may be a known negative electrode, the positive electrode may be a known positive electrode, or the positive electrode and the negative electrode of the secondary battery may each be a known electrode.

[Separator]

In a case in which at least one of the positive electrode and the negative electrode used in the secondary battery includes the presently disclosed functional layer for a secondary battery or the presently disclosed electrode layer for a secondary battery, the separator may be a separator such as described in JP 2012-204303 A, for example. Of these separators, a microporous membrane made of polyolefinic resin (polyethylene, polypropylene, polybutene, or polyvinyl chloride) is preferred since such a membrane can reduce the total thickness of the separator, which increases the ratio of electrode active material in a lithium ion secondary battery, and consequently increases the capacity per volume.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Secondary Battery>

The secondary battery can be produced by, for example, stacking the positive electrode and the negative electrode with the separator in-between, performing rolling, folding, or the like of the resultant stack as necessary to place the stack in a battery container, injecting the electrolyte solution into the battery container, and sealing the battery container. Note that at least one component among the positive electrode, the negative electrode, and the separator is a component that includes the presently disclosed functional layer for a secondary battery or the presently disclosed electrode layer for a secondary battery. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted in the polymer by a repeating unit (monomer unit) that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate (i) the weight-average molecular weight of a polymer A, (ii) foaming of a slurry composition, (iii) thickening of a slurry composition, (iv) adhesive strength, (v) electrode layer peeling during electrode roll pressing, (vi) blocking resistance of a separator, and (vii) cycle characteristics of a secondary battery.

<(i) Weight-Average Molecular Weight of Polymer A>

The weight-average molecular weight of a polymer A was measured by gel permeation chromatography (GPC). First, the polymer A was added to approximately 5 mL of eluent such that the solid content concentration thereof was approximately 0.5 g/L and was slowly dissolved at room temperature. After dissolution of the polymer A had been confirmed by eye, filtration was performed gently using a 0.45 μm filter to prepare a measurement sample. The weight-average molecular weight was calculated as a standard substance-equivalent value by preparing a calibration curve using a standard substance.

The measurement conditions were as follows.

<<Measurement Conditions>>

Column: Produced by Showa Denko K.K.; Product name: Shodex OHpak (SB-G, SB-807HQ, SB-806MHQ)

Eluent: 0.1 M Tris buffer solution (0.1 M of potassium chloride added)

Flow rate: 0.5 mL/min

Sample concentration: 0.05 g/L (solid content concentration)

Injection volume: 200 μL

Column temperature: 40° C.

Detector: Differential refractive index detector RI (produced by Tosoh Corporation; product name: RI-8020)

Standard substance: Monodisperse pullulan (produced by Showa Denko K.K.)

<(ii) Foaming of Slurry Composition>

A vessel having an internal diameter of 6 cm was charged with 100 g of a produced slurry composition. The slurry composition was mixed at 2,000 rpm for 5 minutes by a disper having a serrated disk turbine-type blade of 3 cm in diameter attached thereto. Thereafter, the slurry composition was loaded into a pressurizable case, the internal pressure of the case was adjusted to 0.1 MPa with nitrogen gas, and the slurry composition was held in the case for 3 minutes. The slurry composition was removed from the case and was then observed using a ×20 magnifying glass in order to count the number of bubbles of 0.1 mm or more in diameter present at the liquid surface of the slurry composition.

A smaller number of bubbles indicates greater inhibition of foaming of the slurry composition.

A: 1 or less

B: Not less than 2 and less than 6

C: Not less than 6 and less than 10

D: 10 or more

<(iii) Thickening of Slurry Composition>

The viscosity η of a produced slurry composition for a secondary battery was measured using a B-type viscometer under conditions of a temperature of 25° C., a rotation speed of 60 rpm, and a rotation time of 60 seconds, and was evaluated as follows.

The viscosity of the produced slurry composition at a point prior to addition of 1.5 parts (in terms of solid content) of a polymer B was taken to be η0. Moreover, the viscosity of the slurry composition after addition and mixing of the polymer B was taken to be η1. The ratio of these viscosities was taken to be a slurry viscosity ratio η2.

$$\eta 2 = \eta 1/\eta 0$$

A slurry viscosity ratio η2 closer to 1.0 indicates greater inhibition of slurry thickening and ease of slurry composition production and handling.

A: Slurry viscosity ratio η2 of less than 1.1

B: Slurry viscosity ratio η2 of not less than 1.1 and less than 1.2

C: Slurry viscosity ratio η2 of not less than 1.2 and less than 1.3

D: Slurry viscosity ratio η2 of 1.3 or more

<(iv) Adhesive Strength>

Adhesive strength was measured as peel strength. A rectangle of 1 cm (width)×10 cm (length) was cut from each negative electrode to obtain a test specimen. The test specimen was then secured in place with the negative electrode mixed material layer surface facing upward. Cellophane tape was affixed to the surface of the negative electrode mixed material layer of the test specimen that had been secured in place. Thereafter, the cellophane tape was pulled in a direction at 180° from one end of the test specimen at a speed of 50 mm/min so as to peel off the cellophane tape, and the stress during peeling was measured. This measurement was performed in the same manner five times and an average value of the measurements was taken to be the peel strength. Adhesive strength was then judged by the following standard. A larger peel strength indicates higher adhesive strength.

A: Peel strength of 5 N/m or more

B: Peel strength of not less than 4 N/m and less than 5 N/m

C: Peel strength of not less than 3 N/m and less than 4 N/m

D: Peel strength of less than 3 N/m

<(v) Electrode Layer Peeling during Electrode Roll Pressing>

A produced slurry composition for a secondary battery was used to form an electrode layer with a coating width of 6 cm and a coating weight of 13 mg/cm² on copper foil of 8 cm in width and 30 cm in length. Peeling of the electrode layer during electrode roll pressing was evaluated by the following evaluation standard by measuring the electrode mass W1 before roll pressing, measuring the electrode mass W2 after pressing, and calculating the peeled mass W3 of the electrode layer from the following formula (1). A smaller electrode layer peeled mass W3 indicates greater inhibition of peeling.

$$W3(g)=W1-W2 \qquad (1)$$

A: Electrode layer peeled mass W3 of less than 0.001 g

B: Electrode layer peeled mass W3 of not less than 0.001 g and less than 0.01 g

C: Electrode layer peeled mass W3 of not less than 0.01 g and less than 0.5 g

D: Electrode layer peeled mass W3 of 0.5 g or more

<(vi) Blocking Resistance of Separator>

A separator including a functional layer and a separator that had not been coated with a functional layer were each cut to a square shape of 5 cm (width)×5 cm (length). The obtained square pieces were stacked such that the separator including a functional layer and the separator that had not been coated with a functional layer sandwiched the functional layer therebetween, and were pressed at 10 g/cm² and 40° C. to prepare a measurement sample. The obtained measurement sample was left for 24 hours. The entirety of one of the stacked separators in the measurement sample that had been left for 24 hours was secured in place and the other of the separators was pulled with a force of 0.3 N/m in order to confirm whether or not the separators could be peeled apart. The state of adhesion (blocking state) was evaluated by the following standard. Observation of less adhesion indicates better blocking resistance.

A: Stacked separators are not adhered together

B: Stacked separators are peeled apart

C: Stacked separators are adhered and are not peeled apart

<(vii) Cycle Characteristics of Secondary Battery>

A laminate cell-type lithium ion secondary battery was left at rest in a 25° C. environment for 24 hours after injection of electrolyte solution. The lithium ion secondary battery was subsequently subjected to a charge/discharge operation of charging to a cell voltage of 4.25 V and discharging to a cell voltage of 3.0 V by a 0.1 C constant-current method. The initial capacity C0 was measured. In addition, the lithium ion secondary battery was subjected to 100 charge/discharge cycles of charging to a cell voltage of 4.25 V and discharging to a cell voltage of 3.0 V by a 0.1 C constant-current method in a 60° C. environment. The capacity C2 after 100 cycles was measured. A capacity maintenance rate C3 was calculated by the following formula.

$$C3(\%)=(C2/C0)\times 100$$

A larger value indicates better cycle characteristics.

A: Capacity maintenance rate C3 of 95% or more

B: Capacity maintenance rate C3 of not less than 90% and less than 95%

C: Capacity maintenance rate C3 of not less than 80% and less than 90%

D: Capacity maintenance rate of less than 80%

Example 1

<Production of Polymer A>

A 1 L flask made from glass was charged with 789 parts of deionized water, was heated to a temperature of 40° C., and was internally purged with nitrogen gas at a flow rate of 100 mL/min. Next, 45 parts of acrylic acid as a carboxyl group-containing monomer, 35 parts of acrylamide as an amide group-containing monomer, and 20 parts of butyl acrylate as a carboxylic acid ester-containing monomer were mixed and were injected into the flask. Thereafter, 8.9 parts of a 2.5% aqueous solution of potassium persulfate was added into the flask as a polymerization initiator using a syringe. Once 15 minutes had passed from addition of the potassium persulfate, 22.2 parts of a 2.0% aqueous solution of tetramethylethylenediamine was added as a polymerization accelerator by a syringe, and, in this manner, a polymerization reaction was initiated.

Once 4 hours had passed from addition of the potassium persulfate as a polymerization initiator, 4.4 parts of a 2.5% aqueous solution of potassium persulfate was supplementarily added into the flask as a polymerization initiator, and 11.1 parts of a 2.0% aqueous solution of tetramethylethylenediamine was supplementarily added as a polymerization accelerator. The temperature was raised to 60° C. and was then maintained at 60° C. while carrying out the polymerization reaction. Once 3 hours had passed from supplemental addition of the polymerization initiator, the flask was opened to air and the polymerization reaction was terminated. Deodorization of the polymerization product was performed at a temperature of 80° C. to remove residual monomer and obtain a polymer A. The weight-average molecular weight of the obtained polymer A was measured by the previously described method. The result is shown in Table 1-1.

<Production of Polymer B>

A 5 MPa pressure vessel A equipped with a stirrer was charged with 3.15 parts of styrene as an aromatic-containing monomer, 1.66 parts of 1,3-butadiene as an aliphatic conjugated diene monomer, 0.19 parts of itaconic acid as another monomer, 0.2 parts of sodium lauryl sulfate as an emulsifier, 20 parts of deionized water, and 0.03 parts of potassium persulfate as a polymerization initiator. These materials were sufficiently stirred, were subsequently heated to 60° C. to initiate polymerization, and were reacted for 6 hours to obtain seed particles.

After this reaction, heating was performed to 75° C., addition of a mixture of 58.85 parts of styrene as an aromatic-containing monomer, 33.34 parts of 1,3-butadiene as an aliphatic conjugated diene monomer, 0.81 parts of itaconic acid as another monomer, 1 part of methyl methacrylate as another monomer ((meth)acrylic acid ester monomer), 0.25 parts of tert-dodecyl mercaptan as a chain transfer agent, and 0.35 parts of sodium lauryl sulfate as an emulsifier to the pressure vessel A from a separate vessel B was initiated, and, simultaneously thereto, addition of 1 part of potassium persulfate to the pressure vessel A as a polymerization initiator was initiated so as to initiate a second stage of polymerization.

Once 4 hours had passed from the start of the second stage of polymerization (once 70% of the entire monomer composition had been added), 1 part of 2-hydroxyethyl acrylate was added into the pressure vessel A as another monomer over 1.5 hours.

In other words, 62 parts of styrene as an aromatic vinyl monomer, 35 parts of 1,3-butadiene as an aliphatic conjugated diene monomer, 1 part of itaconic acid as another monomer, 1 part of 2-hydroxyethyl acrylate as another monomer, and 1 part of methyl methacrylate as another monomer were used as the overall monomer composition.

Addition of the mixture containing this monomer composition was completed once 5.5 hours had passed from the start of the second stage of polymerization. Heating was subsequently performed to 85° C. and the reaction was continued for 6 hours.

Cooling was performed to terminate the reaction once the polymerization conversion rate reached 97%. The mixture containing the polymerized product was adjusted to pH 8 through addition of 5% sodium hydroxide aqueous solution. Thereafter, unreacted monomer was removed by thermal-vacuum distillation. Cooling was then performed to yield a particulate polymer B containing the target polymerized product.

<Production of Slurry Composition for Secondary Battery>

A planetary mixer equipped with a disper was charged with 97.5 parts of artificial graphite (volume-average particle diameter: 24.5 μm) having a specific surface area of 4 m$^2$/g as an electrode active material and 1.0 parts (in terms of solid content) of the polymer A. These materials were adjusted to a solid content concentration of 55% with deionized water and were mixed at room temperature for 60 minutes. Next, the solid content concentration was adjusted to 50% with deionized water and a further 15 minutes of mixing was performed to obtain a mixture.

The mixture was then mixed with 1.5 parts (in terms of solid content) of the polymer B for 10 minutes. The resultant mixture was subjected to a defoaming process under reduced pressure to yield a slurry composition for a secondary battery having good fluidity. Foaming and thickening of the obtained slurry composition for a secondary battery were evaluated by the previously described methods. The obtained slurry composition for a secondary battery was also used to evaluate electrode layer peeling during electrode roll pressing. The results are shown in Table 1-1.

<Production of Negative Electrode>

The slurry composition for a secondary battery described above was applied onto copper foil (current collector) of 18 μm in thickness by a comma coater such as to have a thickness after drying of approximately 150 μm. The copper foil with the slurry composition for a secondary battery applied thereon was conveyed inside a 75° C. oven for 2 minutes and a 120° C. oven for 2 minutes at a speed of 0.5 m/min so as to dry the slurry composition on the copper foil and obtain a negative electrode web. The negative electrode web was rolled by roll pressing to obtain a negative electrode having a negative electrode mixed material layer thickness of 80 μm.

Adhesive strength (close adherence strength of negative electrode mixed material layer and copper foil (current collector)) was measured with respect to the obtained negative electrode by the previously described method.

<Production of Positive Electrode>

A slurry composition for a lithium ion secondary battery positive electrode (not corresponding to the presently disclosed slurry composition for a secondary battery) was obtained by mixing 95 parts of LiCoO$_2$ (average particle diameter: 14.8 μm) having a spinel structure as a positive electrode active material, 3 parts in terms of solid content of PVDF (polyvinylidene fluoride) as a binder for a positive electrode mixed material layer, 2 parts of acetylene black (average particle diameter: 50 nm) as a conductive material, and 20 parts of N-methylpyrrolidone as a solvent in a planetary mixer.

The obtained slurry composition for a lithium ion secondary battery positive electrode was applied onto aluminum foil (current collector) of 20 μm in thickness by a comma coater such as to have a thickness after drying of approximately 100 μm. The aluminum foil with the slurry composition for a lithium ion secondary battery positive electrode applied thereon was conveyed inside a 60° C. oven for 2 minutes and a 120° C. oven for 2 minutes at a speed of 0.5 m/min so as to dry the slurry composition for a lithium ion secondary battery positive electrode on the aluminum foil and obtain a positive electrode web. The positive electrode web was rolled by roll pressing to obtain a positive electrode having a positive electrode mixed material layer thickness of 70 μm.

<Preparation of Separator>

A separator made from a single layer of polypropylene (width: 65 mm; length: 500 mm; thickness: 25 μm; produced by a dry method; porosity: 55%) was prepared. A square of 5 cm×5 cm was cut out from the separator for use in the lithium ion secondary battery described below.

<Production of Secondary Battery>

An aluminum packing case was prepared as a battery case. A square of 4 cm×4 cm was cut out from the positive electrode and was arranged with the surface at the current collector side of the positive electrode in contact with the aluminum packing case. Next, the square separator was arranged on the surface of the positive electrode mixed material layer of the positive electrode. In addition, a square of 4.2 cm×4.2 cm was cut out from the negative electrode and was arranged on the separator such that the surface at the negative electrode mixed material layer side of the negative electrode faced toward the separator. Thereafter, the aluminum packing case was filled with LiPF$_6$ solution of 1.0 M in concentration (solvent: mixed solvent of ethylene carbonate (EC)/diethyl carbonate (DEC)=½ (volume ratio); additive: 2 volume % (solvent ratio) of vinylene carbonate) as an electrolyte solution. The aluminum packing case was then closed by heat sealing at 150° C. to tightly seal an opening of the aluminum packing, and thereby produce a laminate cell-type lithium ion secondary battery. Cycle characteristics were evaluated with respect to the obtained lithium ion secondary battery by the previously described method.

Examples 2 to 8 and Comparative Examples 1 to 6

A polymer A, a polymer B, and a slurry composition for a secondary battery were produced, a separator was prepared, and a negative electrode, a positive electrode, and a secondary battery were produced in the same way as in Example 1 with the exception that the types and proportions of monomers used in production of the polymer A were changed as shown in Tables 1-1 to 1-3. Each evaluation was also performed in the same way as in Example 1. The results are shown in Tables 1-1 to 1-3.

Example 9

A polymer A, a polymer B, and a slurry composition for a secondary battery were produced, a separator was prepared, and a negative electrode, a positive electrode, and a secondary battery were produced in the same way as in Example 1 with the exception that 2.5 parts of isopropyl alcohol was added in the same way as each monomer in production of the polymer A so as to adjust a molecular chain growth reaction and thereby obtain a polymer having a weight-average molecular weight of 80,000. Each evaluation was also performed in the same way as in Example 1. The results are shown in Table 1-2.

Example 10

A polymer A, a polymer B, and a slurry composition for a secondary battery were produced, a separator was prepared, and a negative electrode, a positive electrode, and a secondary battery were produced in the same way as in Example 1 with the exception that 589 parts of deionized water was added instead of 789 parts of deionized water in production of the polymer A in Example 1 such that a molecular chain growth reaction was adjusted and a polymer having a weight-average molecular weight of 8,500,000 was obtained. Each evaluation was also performed in the same way as in Example 1. The results are shown in Table 1-2.

Example 11

A polymer A and a slurry composition for a secondary battery were produced, a separator was prepared, and a negative electrode, a positive electrode, and a secondary battery were produced in the same way as in Example 1 with the exception that production of a polymer B was carried out as described below. Each evaluation was also performed in the same way as in Example 1. The results are shown in Table 1-2.

<Production of Polymer B>

A 5 MPa pressure vessel A equipped with a stirrer was charged with 3.15 parts of styrene as an aromatic-containing monomer, 1.66 parts of 1,3-butadiene as an aliphatic conjugated diene monomer, 0.19 parts of itaconic acid as another monomer, 0.2 parts of sodium lauryl sulfate as an emulsifier, 20 parts of deionized water, and 0.03 parts of potassium persulfate as a polymerization initiator. These materials were sufficiently stirred, were subsequently heated to 60° C. to initiate polymerization, and were reacted for 6 hours to obtain seed particles.

After this reaction, heating was performed to 75° C., addition of a mixture of 75.85 parts of styrene as an aromatic-containing monomer, 16.34 parts of 1,3-butadiene as an aliphatic conjugated diene monomer, 0.81 parts of itaconic acid as another monomer, 1 part of methyl methacrylate as another monomer ((meth)acrylic acid ester monomer), 0.25 parts of tert-dodecyl mercaptan as a chain transfer agent, and 0.35 parts of sodium lauryl sulfate as an emulsifier to the pressure vessel A from a separate vessel B was initiated, and, simultaneously thereto, addition of 1 part of potassium persulfate to the pressure vessel A as a polymerization initiator was initiated so as to initiate a second stage of polymerization.

Once 4 hours had passed from the start of the second stage of polymerization (once 70% of the entire monomer composition had been added), 1 part of 2-hydroxyethyl acrylate was added into the pressure vessel A as another monomer over 1.5 hours.

In other words, 79 parts of styrene as an aromatic vinyl monomer, 18 parts of 1,3-butadiene as an aliphatic conjugated diene monomer, 1 part of itaconic acid as another monomer, 1 part of 2-hydroxyethyl acrylate as another monomer, and 1 part of methyl methacrylate as another monomer were used as the overall monomer composition.

Addition of the mixture containing this monomer composition was completed once 5.5 hours had passed from the start of the second stage of polymerization. Heating was subsequently performed to 85° C. and the reaction was continued for 6 hours.

Cooling was performed to terminate the reaction once the polymerization conversion rate reached 97%. The mixture containing the polymerized product was adjusted to pH 8 through addition of 5% sodium hydroxide aqueous solution. Thereafter, unreacted monomer was removed by thermal-vacuum distillation. Cooling was then performed to yield a particulate polymer B containing the target polymerized product.

Example 12

A polymer A and a slurry composition for a secondary battery were produced, a separator was prepared, and a negative electrode, a positive electrode, and a secondary battery were produced in the same way as in Example 1 with the exception that production of a polymer B was carried out as described below. Each evaluation was also performed in the same way as in Example 1. The results are shown in Table 1-2.

<Production of Polymer B>

A 5 MPa pressure vessel A equipped with a stirrer was charged with 3.15 parts of styrene as an aromatic-containing monomer, 1.66 parts of 1,3-butadiene as an aliphatic conjugated diene monomer, 0.19 parts of itaconic acid as another monomer, 0.2 parts of sodium lauryl sulfate as an emulsifier, 20 parts of deionized water, and 0.03 parts of potassium persulfate as a polymerization initiator. These materials were sufficiently stirred, were subsequently heated to 60° C. to initiate polymerization, and were reacted for 6 hours to obtain seed particles.

After this reaction, heating was performed to 75° C., addition of a mixture of 24.85 parts of styrene as an aromatic-containing monomer, 67.34 parts of 1,3-butadiene as an aliphatic conjugated diene monomer, 0.81 parts of itaconic acid as another monomer, 1 part of methyl methacrylate as another monomer ((meth)acrylic acid ester monomer), 0.25 parts of tert-dodecyl mercaptan as a chain transfer agent, and 0.35 parts of sodium lauryl sulfate as an emulsifier to the pressure vessel A from a separate vessel B was initiated, and, simultaneously thereto, addition of 1 part of potassium persulfate to the pressure vessel A as a polymerization initiator was initiated so as to initiate a second stage of polymerization.

Once 4 hours had passed from the start of the second stage of polymerization (once 70% of the entire monomer composition had been added), 1 part of 2-hydroxyethyl acrylate was added into the pressure vessel A as another monomer over 1.5 hours.

In other words, 28 parts of styrene as an aromatic vinyl monomer, 69 parts of 1,3-butadiene as an aliphatic conjugated diene monomer, 1 part of itaconic acid as another monomer, 1 part of 2-hydroxyethyl acrylate as another monomer, and 1 part of methyl methacrylate as another monomer were used as the overall monomer composition.

Addition of the mixture containing this monomer composition was completed once 5.5 hours had passed from the start of the second stage of polymerization. Heating was subsequently performed to 85° C. and the reaction was continued for 6 hours.

Cooling was performed to terminate the reaction once the polymerization conversion rate reached 97%. The mixture containing the polymerized product was adjusted to pH 8 through addition of 5% sodium hydroxide aqueous solution. Thereafter, unreacted monomer was removed by thermal-vacuum distillation. Cooling was then performed to yield a particulate polymer B containing the target polymerized product.

Examples 13 to 15

A polymer A and a slurry composition for a secondary battery were produced, a separator was prepared, and a negative electrode, a positive electrode, and a secondary battery were produced in the same way as in Example 1 with the exception that the amounts of itaconic acid and styrene used in production of the polymer B in Example 1 were changed to the amounts recorded in Table 1-2. Each evaluation was also performed in the same way as in Example 1. The results are shown in Table 1-2.

Example 16

A polymer A, a polymer B, and a positive electrode were produced in the same way as in Example 1 with the exception that production of a slurry composition for a secondary battery (composition for separator coating), a negative electrode, a separator, and a secondary battery were carried out as described below. Each evaluation was also performed in the same way as in Example 1 with the exception that blocking resistance of the separator was evaluated instead of electrode layer peeling during electrode roll pressing, and adhesive strength was evaluated as described below. The results are shown in Table 1-2.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a particulate binder (SBR). The mixture containing the particulate binder was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing the target particulate binder.

Next, 100 parts of artificial graphite (average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a thickener, and deionized water were mixed and adjusted to a solid content concentration of 68%. Mixing was then performed at 25° C. for 60 minutes. The solid content concentration was adjusted to 62% with deionized water and then further mixing was performed at 25° C. for 15 minutes. Deionized water and 1.5 parts by mass in terms of solid content of the particulate binder (SBR) were added to the resultant mixture, the final solid content concentration was adjusted to 52%, and further mixing was performed for 10 minutes. The resultant mixture was subjected to a defoaming process under reduced pressure to yield a slurry composition for a secondary battery negative electrode having good fluidity.

The slurry composition for a negative electrode obtained as described above was applied onto copper foil (current collector) of 20 μm in thickness by a comma coater such as to have a thickness after drying of approximately 150 μm. The slurry composition was dried by conveying the copper foil inside a 60° C. oven for 2 minutes at a speed of 0.5 m/min. Thereafter, heat treatment was performed at 120° C. for 2 minutes to obtain a pre-pressing negative electrode web. The pre-pressing negative electrode web was rolled by roll pressing to obtain a post-pressing negative electrode having a negative electrode mixed material layer thickness of 80 μm.

<Production of Slurry Composition for Secondary Battery (Composition for Separator Coating)>

Water, 94 parts of aluminum oxide (alumina; volume-average particle diameter: 0.5 μm) as non-conductive particles, and 1.0 parts of ammonium polycarboxylate (ARON A-6114 produced by Toagosei Co., Ltd.) as a dispersant were mixed. The amount of water was adjusted such that the solid content concentration was 50%. The mixture was processed using a medialess disperser so as to disperse the aluminum oxide (alumina) and obtain a slurry. The obtained slurry was mixed with 2.0 parts (in terms of solid content) of the polymer A. The added polymer A dissolved in the mixture. Next, 3.0 parts (in terms of solid content) of the polymer B and 0.2 parts of an aliphatic polyether nonionic surfactant as a wetting agent were added, and water was also added to adjust the solid content concentration to 40%, and thereby obtain a slurry composition for a secondary battery (composition for separator coating). Foaming and thickening of the obtained slurry composition for a secondary battery (composition for separator coating) were evaluated by the previously described methods. The results are shown in Table 1-2.

<Production of Separator>

The produced slurry composition for a secondary battery (composition for separator coating) was sealed in a polyethylene vessel and was left at rest for 30 days. Thereafter, an impeller was inserted into the polyethylene vessel and was used to perform stirring at a rotation speed of 250 rpm. This stirring was continued for a further 30 minutes after adhered material was no longer visible at the bottom of the vessel so as to redisperse the non-conductive particles (aluminum oxide (alumina)) in the composition for a functional layer.

A single-layered polyethylene separator substrate (width: 250 mm; length: 1,000 m; thickness: 12 μm) that had been produced by a wet method was prepared. The redispersed composition for separator coating was applied onto one side (for separator blocking resistance test and adhesive strength evaluation) or both sides (for cycling test) of the separator substrate by a gravure coater (application rate: 20 m/min) such as to have a thickness after drying of 2.5 μm. Next, the separator substrate with the composition for separator coating applied thereon was dried in a 50° C. drying oven and was wound up to produce a separator including a functional layer formed on the separator substrate. A square of 5 cm×5 cm was cut out from the separator and was used in a lithium ion secondary battery described below.

<Production of Secondary Battery>

An aluminum packing case was prepared as a battery case. A square of 4 cm×4 cm was cut out from the positive electrode and was arranged with the surface at the current collector side of the positive electrode in contact with the aluminum packing case. Next, the square separator was arranged on the surface of the positive electrode mixed material layer of the positive electrode. In addition, a square of 4.2 cm×4.2 cm was cut out from the negative electrode and was arranged on the separator such that the surface at the negative electrode mixed material layer side of the negative electrode faced toward the separator. Thereafter, the aluminum packing case was filled with LiPF$_6$ solution of 1.0 M in concentration (solvent: mixed solvent of ethylene carbonate (EC)/diethyl carbonate (DEC)=½ (volume ratio); additive: 2 volume % (solvent ratio) of vinylene carbonate) as an electrolyte solution. The aluminum packing case was then closed by heat sealing at 150° C. to tightly seal an opening of the aluminum packing, and thereby produce a laminate cell-type lithium ion secondary battery. Cycle characteristics were evaluated with respect to the obtained lithium ion secondary battery by the previously described method.

<(iv) Adhesive Strength>

Adhesive strength was measured as peel strength. A rectangle of 1 cm (width)×10 cm (length) was cut from each separator to obtain a test specimen that was then secured in place (with a functional layer at the surface). Cellophane tape was affixed to the surface of the functional layer of the test specimen that had been secured in place. Thereafter, the cellophane tape was pulled in a direction at 180° from one end of the test specimen at a speed of 50 mm/min so as to peel off the cellophane tape, and the stress during peeling was measured. This measurement was performed in the same manner five times and an average value of the measurements was taken to be the peel strength. Adhesive strength was then judged by the following standard. A larger peel strength indicates higher adhesive strength.

A: Peel strength of 5 N/m or more
B: Peel strength of not less than 4 N/m and less than 5 N/m
C: Peel strength of not less than 3 N/m and less than 4 N/m
D: Peel strength of less than 3 N/m

TABLE 1-1

| | | | Example 1 | Example 2 | Example 3 | Example 4 |
|---|---|---|---|---|---|---|
| Polymer A | Amide group-containing monomer | Type | Acrylamide | Acrylamide | Acrylamide | Acrylamide |
| | | Additive amount (parts) | 35 | 38 | 26 | 27 |
| | Carboxyl group-containing monomer | Type | Acrylic acid | Acrylic acid | Acrylic acid | Acrylic acid |
| | | Additive amount (parts) | 45 | 43 | 48 | 49 |
| | Carboxylic acid ester-containing monomer | Type | Butyl acrylate | Butyl acrylate | Butyl acrylate | Butyl acrylate |
| | | Alkyl chain carbon number | 4 | 4 | 4 | 4 |
| | | Additive amount (parts) | 20 | 19 | 26 | 24 |
| | Weight-average molecular weight | | 4000000 | 4000000 | 4000000 | 4000000 |
| Polymer B | Aliphatic conjugated diene monomer | Type | Butadiene | Butadiene | Butadiene | Butadiene |
| | | Additive amount (parts) | 35 | 35 | 35 | 35 |
| | Aromatic-containing monomer | Type | Styrene | Styrene | Styrene | Styrene |
| | | Additive amount (parts) | 62.0 | 62.0 | 62.0 | 62.0 |
| | Other monomers | Type | Itaconic acid | Itaconic acid | Itaconic acid | Itaconic acid |
| | | Additive amount (parts) | 1.0 | 1.0 | 1.0 | 1.0 |
| | | Type | 2-Hydroxyethyl acrylate | 2-Hydroxyethyl acrylate | 2-Hydroxyethyl acrylate | 2-Hydroxyethyl acrylate |
| | | Additive amount (parts) | 1 | 1 | 1 | 1 |
| | | Type | Methyl methacrylate | Methyl methacrylate | Methyl methacrylate | Methyl methacrylate |
| | | Additive amount (parts) | 1 | 1 | 1 | 1 |
| Shiny composition for negative electrode | Electrode active material | Type | Artificial graphite | Artificial graphite | Artificial graphite | Artificial graphite |
| | | Additive amount (parts) | 97.5 | 97.5 | 97.5 | 97.5 |
| | Polymer A | Additive amount (parts) | 1 | 1 | 1 | 1 |
| | Polymer B | Additive amount (parts) | 1.5 | 1.5 | 1.5 | 1.5 |

TABLE 1-1-continued

|  |  |  |  |  |  |  |
|---|---|---|---|---|---|---|
| Shiny composition for separator | Non-conductive fine particles | Type | — | — | — | — |
|  |  | Additive amount (parts) | — | — | — | — |
|  | Dispersant | Type | — | — | — | — |
|  |  | Additive amount (parts) | — | — | — | — |
|  | Polymer A | Additive amount (parts) | — | — | — | — |
|  | Polymer B | Additive amount (parts) | — | — | — | — |
| Evaluation | Foaming of slurry composition |  | A | A | B | B |
|  | Thickening of slurry composition |  | A | A | B | B |
|  | Adhesive strength |  | A | A | A | A |
|  | Mixed material layer peeling during electrode roll pressing |  | A | B | B | A |
|  | Blocking resistance of separator |  | — | — | — | — |
|  | Cycle characteristics of secondary battery |  | A | A | B | B |

|  |  |  | Example 5 | Example 6 | Example 7 | Example 8 |
|---|---|---|---|---|---|---|
| Polymer A | Amide group-containing monomer | Type | Acrylamide | Acrylamide | Acrylamide | Acrylamide |
|  |  | Additive amount (parts) | 40 | 39 | 35 | 35 |
|  | Carboxyl group-containing monomer | Type | Acrylic acid | Acrylic acid | Acrylic acid | Acrylic acid |
|  |  | Additive amount (parts) | 32 | 48 | 45 | 45 |
|  | Carboxylic acid ester-containing monomer | Type | Butyl acrylate | Butyl acrylate | Ethyl acrylate | 2-Ethylhexyl acrylate |
|  |  | Alkyl chain carbon number | 4 | 4 | 2 | 8 |
|  |  | Additive amount (parts) | 28 | 13 | 20 | 20 |
|  | Weight-average molecular weight |  | 4000000 | 4000000 | 4000000 | 4000000 |
| Polymer B | Aliphatic conjugated diene monomer | Type | Butadiene | Butadiene | Butadiene | Butadiene |
|  |  | Additive amount (parts) | 35 | 35 | 35 | 35 |
|  | Aromatic-containing monomer | Type | Styrene | Styrene | Styrene | Styrene |
|  |  | Additive amount (parts) | 62.0 | 62.0 | 62.0 | 62.0 |
|  | Other monomers | Type | Itaconic acid | Itaconic acid | Itaconic acid | Itaconic acid |
|  |  | Additive amount (parts) | 1.0 | 1.0 | 1.0 | 1.0 |
|  |  | Type | 2-Hydroxyethyl acrylate | 2-Hydroxyethyl acrylate | 2-Hydroxyethyl acrylate | 2-Hydroxyethyl acrylate |
|  |  | Additive amount (parts) | 1 | 1 | 1 | 1 |
|  |  | Type | Methyl methacrylate | Methyl methacrylate | Methyl methacrylate | Methyl methacrylate |
|  |  | Additive amount (parts) | 1 | 1 | 1 | 1 |
| Shiny composition for negative electrode | Electrode active material | Type | Artificial graphite | Artificial graphite | Artificial graphite | Artificial graphite |
|  |  | Additive amount (parts) | 97.5 | 97.5 | 97.5 | 97.5 |
|  | Polymer A | Additive amount (parts) | 1 | 1 | 1 | 1 |
|  | Polymer B | Additive amount (parts) | 1.5 | 1.5 | 1.5 | 1.5 |
| Shiny composition for separator | Non-conductive fine particles | Type | — | — | — | — |
|  |  | Additive amount (parts) | — | — | — | — |
|  | Dispersant | Type | — | — | — | — |
|  |  | Additive amount (parts) | — | — | — | — |
|  | Polymer A | Additive amount (parts) | — | — | — | — |
|  | Polymer B | Additive amount (parts) | — | — | — | — |
| Evaluation | Foaming of slurry composition |  | B | A | A | B |
|  | Thickening of slurry composition |  | A | B | B | A |
|  | Adhesive strength |  | A | A | A | A |
|  | Mixed material layer peeling during electrode roll pressing |  | B | B | B | A |

TABLE 1-1-continued

|  |  |  |  |  |
|---|---|---|---|---|
| Blocking resistance of separator | — | — | — | — |
| Cycle characteristics of secondary battery | A | A | A | A |

TABLE 1-2

| | | | Example 9 | Example 10 | Example 11 | Example 12 |
|---|---|---|---|---|---|---|
| Polymer A | Amide group-containing monomer | Type | Acrylamide | Acrylamide | Acrylamide | Acrylamide |
| | | Additive amount (parts) | 35 | 35 | 35 | 35 |
| | Carboxyl group-containing monomer | Type | Acrylic acid | Acrylic acid | Acrylic acid | Acrylic acid |
| | | Additive amount (parts) | 45 | 45 | 45 | 45 |
| | Carboxylic acid ester-containing monomer | Type | Butyl acrylate | Butyl acrylate | Butyl acrylate | Butyl acrylate |
| | | Alkyl chain carbon number | 4 | 4 | 4 | 4 |
| | | Additive amount (parts) | 20 | 20 | 20 | 20 |
| | Weight-average molecular weight | | 80000 | 8500000 | 4000000 | 4000000 |
| Polymer B | Aliphatic conjugated diene monomer | Type | Butadiene | Butadiene | Butadiene | Butadiene |
| | | Additive amount (parts) | 35 | 35 | 18 | 69 |
| | Aromatic-containing monomer | Type | Styrene | Styrene | Styrene | Styrene |
| | | Additive amount (parts) | 62.0 | 62.0 | 79.0 | 28.0 |
| | Other monomers | Type | Itaconic acid | Itaconic acid | Itaconic acid | Itaconic acid |
| | | Additive amount (parts) | 1.0 | 1.0 | 1.0 | 1.0 |
| | | Type | 2-Hydroxyethyl acrylate | 2-Hydroxyethyl acrylate | 2-Hydroxyethyl acrylate | 2-Hydroxyethyl acrylate |
| | | Additive amount (parts) | 1 | 1 | 1 | 1 |
| | | Type | Methyl methacrylate | Methyl methacrylate | Methyl methacrylate | Methyl methacrylate |
| | | Additive amount (parts) | 1 | 1 | 1 | 1 |
| Slurry composition for negative electrode | Electrode active material | Type | Artificial graphite | Artificial graphite | Artificial graphite | Artificial graphite |
| | | Additive amount (parts) | 97.5 | 97.5 | 97.5 | 97.5 |
| | Polymer A | Additive amount (parts) | 1 | 1 | 1 | 1 |
| | Polymer B | Additive amount (parts) | 1.5 | 1.5 | 1.5 | 1.5 |
| Slurry composition for separator | Non-conductive fine particles | Type | — | — | — | — |
| | | Additive amount (parts) | — | — | — | — |
| | Dispersant | Type | — | — | — | — |
| | | Additive amount (parts) | — | — | — | — |
| | Polymer A | Additive amount (parts) | — | — | — | — |
| | Polymer B | Additive amount (parts) | — | — | — | — |
| Evaluation | Foaming of slurry composition | | A | A | A | A |
| | Thickening of slurry composition | | A | B | B | A |
| | Adhesive strength | | B | A | B | A |
| | Mixed material layer peeling during electrode roll pressing | | A | B | A | B |
| | Blocking resistance of separator | | — | — | — | — |
| | Cycle characteristics of secondary battery | | A | A | A | A |

| | | | Example 13 | Example 14 | Example 15 | Example 16 |
|---|---|---|---|---|---|---|
| Polymer A | Amide group-containing monomer | Type | Acrylamide | Acrylamide | Acrylamide | Acrylamide |
| | | Additive amount (parts) | 35 | 35 | 35 | 35 |
| | Carboxyl group-containing monomer | Type | Acrylic acid | Acrylic acid | Acrylic acid | Acrylic acid |
| | | Additive amount (parts) | 45 | 45 | 45 | 45 |

TABLE 1-2-continued

|  |  |  |  |  |  |  |
|---|---|---|---|---|---|---|
|  | Carboxylic acid ester-containing monomer | Type | Butyl acrylate | Butyl acrylate | Butyl acrylate | Butyl acrylate |
|  |  | Alkyl chain carbon number | 4 | 4 | 4 | 4 |
|  |  | Additive amount (parts) | 20 | 20 | 20 | 20 |
|  | Weight-average molecular weight |  | 4000000 | 4000000 | 4000000 | 4000000 |
| Polymer B | Aliphatic conjugated diene monomer | Type | Butadiene | Butadiene | Butadiene | Butadiene |
|  |  | Additive amount (parts) | 35 | 35 | 35 | 35 |
|  | Aromatic-containing monomer | Type | Styrene | Styrene | Styrene | Styrene |
|  |  | Additive amount (parts) | 62.4 | 61.0 | 58.0 | 62.0 |
|  | Other monomers | Type | Itaconic acid | Itaconic acid | Itaconic acid | Itaconic acid |
|  |  | Additive amount (parts) | 0.6 | 2.0 | 5.0 | 1.0 |
|  |  | Type | 2-Hydroxyethyl acrylate | 2-Hydroxyethyl acrylate | 2-Hydroxyethyl acrylate | 2-Hydroxyethyl acrylate |
|  |  | Additive amount (parts) | 1 | 1 | 1 | 1 |
|  |  | Type | Methyl methacrylate | Methyl methacrylate | Methyl methacrylate | Methyl methacrylate |
|  |  | Additive amount (parts) | 1 | 1 | 1 | 1 |
| Slurry composition for negative electrode | Electrode active material | Type | Artificial graphite | Artificial graphite | Artificial graphite | — |
|  |  | Additive amount (parts) | 97.5 | 97.5 | 97.5 | — |
|  | Polymer A | Additive amount (parts) | 1 | 1 | 1 | — |
|  | Polymer B | Additive amount (parts) | 1.5 | 1.5 | 1.5 | — |
| Slurry composition for separator | Non-conductive fine particles | Type | — | — | — | Alumina |
|  |  | Additive amount (parts) | — | — | — | 94 |
|  | Dispersant | Type | — | — | — | Ammonium poly-carboxylate |
|  |  | Additive amount (parts) | — | — | — | 1 |
|  | Polymer A | Additive amount (parts) | — | — | — | 2 |
|  | Polymer B | Additive amount (parts) | — | — | — | 3 |
| Evaluation | Foaming of slurry composition |  | A | A | A | A |
|  | Thickening of slurry composition |  | B | A | A | A |
|  | Adhesive strength |  | B | B | B | A |
|  | Mixed material layer peeling during electrode roll pressing |  | A | A | B | — |
|  | Blocking resistance of separator |  | — | — | — | A |
|  | Cycle characteristics of secondary battery |  | A | A | A | A |

TABLE 1-3

|  |  |  | Comparative Example 1 | Comparative Example 2 | Comparative Example 3 |
|---|---|---|---|---|---|
| Polymer A | Amide group-containing monomer | Type | Acrylamide | Acrylamide | Acrylamide |
|  |  | Additive amount (parts) | 0 | 42 | 40 |
|  | Carboxyl group-containing monomer | Type | Acrylic acid | Acrylic acid | Acrylic acid |
|  |  | Additive amount (parts) | 50 | 28 | 50 |
|  | Carboxylic acid ester-containing monomer | Type | Butyl acrylate | Butyl acrylate | Butyl acrylate |
|  |  | Alkyl chain carbon number | 4 | 4 | 4 |
|  |  | Additive amount (parts) | 50 | 30 | 10 |
|  | Weight-average molecular weight |  | 4000000 | 4000000 | 4000000 |
| Polymer B | Aliphatic conjugated diene monomer | Type | Butadiene | Butadiene | Butadiene |
|  |  | Additive amount (parts) | 35 | 35 | 35 |

TABLE 1-3-continued

|  |  |  |  |  |  |
| --- | --- | --- | --- | --- | --- |
|  | Aromatic-containing monomer | Type | Styrene | Styrene | Styrene |
|  |  | Additive amount (parts) | 62.0 | 62.0 | 62.0 |
|  | Other monomers | Type | Itaconic acid | Itaconic acid | Itaconic acid |
|  |  | Additive amount (parts) | 1.0 | 1.0 | 1.0 |
|  |  | Type | 2-Hydroxyethyl acrylate | 2-Hydroxyethyl acrylate | 2-Hydroxyethyl acrylate |
|  |  | Additive amount (parts) | 1 | 1 | 1 |
|  |  | Type | Methyl methacrylate | Methyl methacrylate | Methyl methacrylate |
|  |  | Additive amount (parts) | 1 | 1 | 1 |
| Slurry composition for negative electrode | Electrode active material | Type | Artificial graphite | Artificial graphite | Artificial graphite |
|  |  | Additive amount (parts) | 97.5 | 97.5 | 97.5 |
|  | Polymer A | Additive amount (parts) | 1 | 1 | 1 |
|  | Polymer B | Additive amount (parts) | 1.5 | 1.5 | 1.5 |
| Slurry composition for separator | Non-conductive fine particles | Type | — | — | — |
|  |  | Additive amount (parts) | — | — | — |
|  | Dispersant | Type | — | — | — |
|  |  | Additive amount (parts) | — | — | — |
|  | Polymer A | Additive amount (parts) | — | — | — |
|  | Polymer B | Additive amount (parts) | — | — | — |
| Evaluation | Foaming of slurry composition |  | D | A | A |
|  | Thickening of slurry composition |  | C | A | C |
|  | Adhesive strength |  | B | A | A |
|  | Mixed material layer peeling during electrode rollpressing |  | D | D | D |
|  | Blocking resistance of separator |  | — | — | — |
|  | Cycle characteristics of secondary battery |  | D | C | B |

|  |  |  | Comparative Example 4 | Comparative Example 5 | Comparative Example 6 |
| --- | --- | --- | --- | --- | --- |
| Polymer A | Amide group-containing monomer | Type | Acrylamide | Acrylamide | Acrylamide |
|  |  | Additive amount (parts) | 35 | 35 | 35 |
|  | Carboxyl group-containing monomer | Type | Acrylic acid | Acrylic acid | Acrylic acid |
|  |  | Additive amount (parts) | 35 | 45 | 45 |
|  | Carboxylic acid ester-containing monomer | Type | Butyl acrylate | Methyl acrylate | Dodecyl acrylate |
|  |  | Alkyl chain carbon number | 4 | 1 | 10 |
|  |  | Additive amount (parts) | 30 | 20 | 20 |
|  | Weight-average molecular weight |  | 4000000 | 4000000 | 4000000 |
| Polymer B | Aliphatic conjugated diene monomer | Type | Butadiene | Butadiene | Butadiene |
|  |  | Additive amount (parts) | 35 | 35 | 35 |
|  | Aromatic-containing monomer | Type | Styrene | Styrene | Styrene |
|  |  | Additive amount (parts) | 62.0 | 62.0 | 62.0 |
|  | Other monomers | Type | Itaconic acid | Itaconic acid | Itaconic acid |
|  |  | Additive amount (parts) | 1.0 | 1.0 | 1.0 |
|  |  | Type | 2-Hydroxyethyl acrylate | 2-Hydroxyethyl acrylate | 2-Hydroxyethyl acrylate |
|  |  | Additive amount (parts) | 1 | 1 | 1 |
|  |  | Type | Methyl methacrylate | Methyl methacrylate | Methyl methacrylate |
|  |  | Additive amount (parts) | 1 | 1 | 1 |

TABLE 1-3-continued

| | | | | | |
|---|---|---|---|---|---|
| Slurry composition for negative electrode | Electrode active material | Type | Artificial graphite | Artificial graphite | Artificial graphite |
| | | Additive amount (parts) | 97.5 | 97.5 | 97.5 |
| | Polymer A | Additive amount (parts) | 1 | 1 | 1 |
| | Polymer B | Additive amount (parts) | 1.5 | 1.5 | 1.5 |
| Slurry composition for separator | Non-conductive fine particles | Type | — | — | — |
| | | Additive amount (parts) | — | — | — |
| | Dispersant | Type | — | — | — |
| | | Additive amount (parts) | — | — | — |
| | Polymer A | Additive amount (parts) | — | — | — |
| | Polymer B | Additive amount (parts) | — | — | — |
| Evaluation | Foaming of slurry composition | | D | A | D |
| | Thickening of slurry composition | | A | A | A |
| | Adhesive strength | | C | A | C |
| | Mixed material layer peeling during electrode rollpressing | | B | D | C |
| | Blocking resistance of separator | | — | — | — |
| | Cycle characteristics of secondary battery | | C | C | C |

It can be seen from Examples 1 to 16 and Comparative Examples 1 to 6 in Tables 1-1 to 1-3, presented above, that by using a binder composition for a secondary battery that contains a solvent and a polymer A including an amide group-containing monomer unit and a specific amount of a carboxylic acid ester-containing monomer unit including an alkyl chain having a carbon number of not less than 2 and not more than 9, it is possible to produce a slurry composition for a secondary battery having low foaming and improve handleability of a functional layer or electrode layer formed using the produced slurry composition for a secondary battery.

INDUSTRIAL APPLICABILITY

According to the present disclosure, it is possible to provide a binder composition for a secondary battery with which a slurry composition for a secondary battery having low foaming can be produced, and that enables formation of a functional layer or electrode layer having excellent handleability using the produced slurry composition for a secondary battery.

Moreover, according to the present disclosure, it is possible to provide a slurry composition for a secondary battery that can reduce foaming and with which a functional layer or electrode layer having excellent handleability can be formed.

Furthermore, according to the present disclosure, it is possible to provide a functional layer for a secondary battery having excellent handleability.

Also, according to the present disclosure, it is possible to provide an electrode layer for a secondary battery having excellent handleability.

Moreover, according to the present disclosure, it is possible to provide a secondary battery including a functional layer for a secondary battery or an electrode layer for a secondary battery having excellent handleability.

The invention claimed is:

1. A binder composition for a secondary battery comprising a polymer A and a solvent, wherein
the polymer A includes an amide group-containing monomer unit, a carboxylic acid ester-containing monomer unit including an alkyl chain having a carbon number of not less than 2 and not more than 9, and a carboxyl group-containing monomer unit as an acid functional group-containing monomer unit,
content of the amide group-containing monomer unit in the polymer A is not less than 25 mass % and not more than 37 mass %,
content of the carboxylic acid ester-containing monomer unit in the polymer A is not less than 12 mass % and not more than 28 mass %,
the polymer A has a weight-average molecular weight of not more than 8,000,000, and
content of the carboxyl group-containing monomer unit as the acid functional group-containing monomer unit in the polymer A is not less than 35 mass % and not more than 45 mass %.

2. The binder composition for a secondary battery according to claim 1, wherein the polymer A has the weight-average molecular weight of not less than 50,000 and not more than 8,000,000.

3. The binder composition for a secondary battery according to claim 1, further comprising a polymer B, wherein
the polymer B includes either or both of an aliphatic conjugated diene monomer unit and an aromatic-containing monomer unit.

4. A slurry composition for a secondary battery comprising: the binder composition for a secondary battery according to claim 1; and non-conductive fine particles.

5. A slurry composition for a secondary battery comprising: the binder composition for a secondary battery according to claim 1; and an electrode active material.

6. A functional layer for a secondary battery formed using the slurry composition for a secondary battery according to claim 4.

7. An electrode layer for a secondary battery formed using the slurry composition for a secondary battery according to claim 5.

8. A secondary battery comprising a positive electrode, a negative electrode, a separator, and an electrolyte solution, wherein at least one of the positive electrode, the negative electrode, and the separator includes the functional layer for a secondary battery according to claim 6.

\* \* \* \* \*